(12) United States Patent
Fu et al.

(10) Patent No.: US 12,443,986 B2
(45) Date of Patent: Oct. 14, 2025

(54) INTELLIGENT COMPUTER SEARCH ENGINE REMOVAL OF SEARCH RESULTS

(71) Applicant: eBay Inc., San Jose, CA (US)

(72) Inventors: Yuyangzi Fu, Jiangsu (CN); Xueyuan Jiang, Shanghai (CN); Zihao Jiang, Shanghai (CN); Jingying Wang, Shanghai (CN); Kaikai Tong, Shanghai (CN)

(73) Assignee: eBay Inc., San Jose, CA (US)

( * ) Notice: Subject to any disclaimer, the term of this patent is extended or adjusted under 35 U.S.C. 154(b) by 29 days.

(21) Appl. No.: 18/260,768

(22) PCT Filed: Jan. 8, 2021

(86) PCT No.: PCT/CN2021/070798
§ 371 (c)(1),
(2) Date: Jul. 7, 2023

(87) PCT Pub. No.: WO2022/147746
PCT Pub. Date: Jul. 14, 2022

(65) Prior Publication Data
US 2024/0054552 A1    Feb. 15, 2024

(51) Int. Cl.
*G06F 16/9535* (2019.01)
*G06Q 30/0601* (2023.01)

(52) U.S. Cl.
CPC ..... *G06Q 30/0641* (2013.01); *G06F 16/9535* (2019.01); *G06Q 30/0627* (2013.01)

(58) Field of Classification Search
CPC ............ G06Q 30/0641; G06Q 30/0627; G06F 16/9535
See application file for complete search history.

(56) References Cited

U.S. PATENT DOCUMENTS

| 2008/0109327 | A1* | 5/2008 | Mayle ................ G06Q 30/0603 705/27.1 |
| 2010/0114872 | A1* | 5/2010 | Gupta ................. G06F 16/3326 707/E17.014 |
| 2016/0085813 | A1 | 3/2016 | Setty |
| 2017/0270208 | A1 | 9/2017 | Spathelf |

(Continued)

FOREIGN PATENT DOCUMENTS

| CN | 102968418 A | * | 3/2013 | ......... G06F 16/9535 |
| CN | 106815291 A | | 6/2017 | |
| WO | 2012158796 A1 | | 11/2012 | |

OTHER PUBLICATIONS

International Search Report for PCT/CN2021/070798, Mailed Oct. 9, 2021, 2 Pages.

(Continued)

*Primary Examiner* — Grace Park
(74) *Attorney, Agent, or Firm* — Shook, Hardy & Bacon L.L.P./eBay Inc.

(57) ABSTRACT

Computer information retrieval by automatically marking at least a first item listing, of a first set of item listings, as a candidate for removal as a search result for a query. Such automatic marking occurs in response to receiving an indication that a selection has been made at a computing device, where the selection is at least partially indicative of the user requesting removal, from a set of search results, of a first item listing based on a particular attribute value associated with the first item listing.

19 Claims, 12 Drawing Sheets

(56) References Cited

U.S. PATENT DOCUMENTS

2019/0286740 A1    9/2019  Menipaz
2021/0142381 A1*   5/2021  Gutman ............. G06Q 30/0255
2021/0295244 A1*   9/2021  Bennett ............... G06F 16/2428

OTHER PUBLICATIONS

International Preliminary Report on Patentability received for PCT Patent Application No. PCT/CN2021/070798, mailed on Jul. 20, 2023, 6 pages.
European search report received for European Application No. 21916802.8, mailed on Apr. 23, 2024, 7 pages.

* cited by examiner

FIG. 7

INTELLIGENT COMPUTER SEARCH ENGINE REMOVAL OF SEARCH RESULTS

BACKGROUND

Various search technologies receive user input in order to retrieve information particular to the input. For example, after launching a web browser or other application (e.g., an e-Commerce web application), a user can input, within a search engine field, search terms of a query corresponding to a particular resource or topic (e.g., documents, links, web pages, item listings, etc.). Responsively, one or more servers hosting the search engine logic can execute the query by ranking and retrieving data from various data sources and cause a web or app page to display various ranked search results associated with the particular resource or topic. The user may then select one or more of the various ranked search result identifiers.

Although existing search technologies and computers employ various algorithms that rank and determine which search results to render to a user, such existing technologies fail to adequately exclude or remove particular search results for a given query, among other things. This negatively affects the user experience, as well as user interface functionality and accuracy of search technologies. These existing technologies and computers are also deficient in terms of computing resource consumption (e.g., computer I/O).

BRIEF SUMMARY

Particular embodiments of the present disclosure include a computer-implemented method, a non-transitory computer storage medium, and a system. Some aspects are directed to improving search technologies (e.g., search engines, web applications, browsers, etc.) and computer information retrieval by automatically marking at least a first item listing, of a first set of item listings, as a candidate for removal from a search result that was rendered in response to a query. Such automatic marking may occur in response to receiving an indication that a selection (e.g., of a UI button) has been made at a computing device. The selection is at least partially indicative of the user requesting removal, from a set of search results, of a first item listing based on a particular attribute value associated with the first item listing. For example, after search results have been rendered in response to a query, a user can select a single UI button to request removal of each item listing in the search results that: has a particular aspect value (e.g., a color or brand), belongs to a particular item listing category (e.g., computers or beauty), and/or is similar to a selected item listing (e.g., via a deep neural network). This also improves computing resource consumption, among other things. Other advantages, embodiments, improvements and the like are described herein.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present technology is described in detail below with reference to the attached drawing figures, wherein:

FIG. 7 is a screenshot of an example user interface and search result page, according to some embodiments.

DETAILED DESCRIPTION

Figure 1:
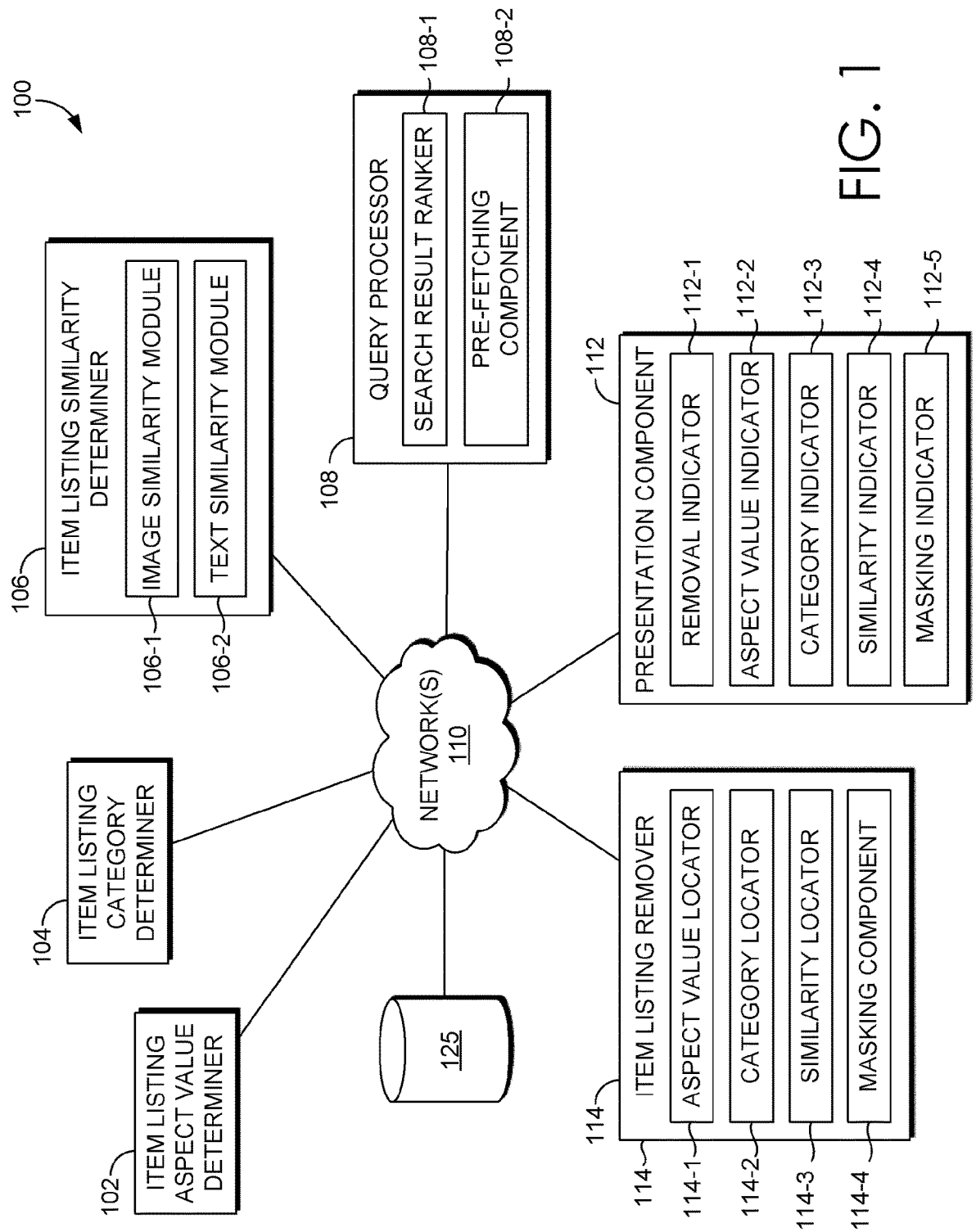
FIG. 1 is a block diagram of an illustrative system architecture in which some embodiments of the present technology may be employed, according to some embodiments.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Existing search technologies (e.g., e-commerce applications, web browser search engines, web applications, etc.) and computers themselves fail to adequately exclude or remove particular search results for a given query. This negatively affects the user experience, as well as search engine accuracy. When users want to buy an item, for example, they may search on an e-Commerce website and describe what they want in a query. However, sometimes users only know what they do not want. Even if they know what they want, their search would be better aided by filtering out unwanted item listings (e.g., a title and image describing an item for sale). Accordingly, the user may have to drill down to various pages, spend lots of time browsing, scroll through various search results, generate multiple queries, or otherwise arduously and manually view several undesired or unwanted item listings before she sees the item listing she likes.

In an illustrative example of this problem, a user may want to purchase a gift for another person with the following ideal requirements for a search. The user may have bought a handbag in the past for this person, so the user may not want to buy the same thing this time. Further, the user may know that the person does not like the color green. The user may desire to use one search to meet all these requirements. But the user may find it difficult or impossible to formulate a query that meets all of these negative requirements of what not to buy or what color the person does not like. Existing search technologies, however, typically employ algorithms for only what will be included in search results, as opposed to criteria for what will be excluded in search results. This causes inaccuracies with respect to ranking and rendering search results that reflect the user intent because the user has to arduously page or scroll through various search results or generate multiple queries before she finds suitable item listings that meet these exclusion criteria, thereby negatively affecting the user experience.

Relatedly, existing user interfaces of search technologies are inadequate and are arduous for user navigation. As discussed above, search technologies typically employ algorithms for what will be included in search results, as opposed to search criteria for what will be excluded in search results. Consequently, the user interface functionality of these technologies typically include a search engine field to input a query into, and a list of ranked search results that are rendered based on the inclusion results of the query. However, using the illustrative example above, a first search result page on the user interface may include several green items and handbags (items that the user does not want). Accordingly, the user will have to drill down to at least a second search results page, scroll down to other search results on the first search results page, generate another query, or otherwise perform multiple clicks, selections, or input on these existing user interfaces. Accordingly, these existing user interfaces are arduous for user navigation to get to the appropriate search results.

Additionally, the functionality of existing search technologies and computers leads to unnecessary computer resource consumption (e.g., I/O, network bandwidth, throughput, CPU utilization). For example, some existing search technologies allow users to delete (e.g., via a swiping gesture) individual search results. However, this functionality only allows users to delete search results manually and one search result at a time. This increases storage device I/O (e.g., excess physical read/write head movements on non-volatile disk) because each time a user issues a request to delete a search result, the computing system often has to reach out to disk to perform a delete operation on disk, which is time consuming, error prone, and can eventually wear on components, such as a read/write head. Further, as described above, because existing search technologies employ algorithms for what will be included in search results, as opposed to adequate criteria for what will be excluded in search results, users have to keep redundantly generating multiple different queries or input to receive relevant search results, which also increases I/O because of the multiple inputs that must be processed.

In another example of computationally and resource intensive functionality of existing technologies and computers, an optimizer engine of a database manager module calculates a query execution plan (e.g., calculates cardinality, selectivity, etc.) each time a query is issued, which requires a database manager to find the least expensive query execution plan to fully execute the query. This decreases throughput and increases network latency, and can waste valuable time when multiple queries for a desired item are issued (which is typically the case when users are not able to specify exclusion criteria). Most database relations contain hundreds if not thousands of records. Repetitively calculating query execution plans on this quantity of records decreases throughput and increases network latency.

Generating these redundant inputs or delete requests of individual search results also causes excessive packet generation costs that adversely affect computer network communications. Each time a user issues a query, issues a deletion request, or makes a selection, for example (because the user is seeing various search results she wants to exclude), the contents or payload of the query is typically supplemented with header information or other metadata within a packet in TCP/IP and other protocol networks that must traverse over the network. Accordingly, for example, when this functionality is multiplied by all these inputs needed to obtain the desired search results, there are network utilization and latency costs by repetitively generating this metadata and sending it over a computer network.

Various embodiments of the present disclosure provide one or more technical solutions to the technical problems described above, as well as other problems. In operation, various embodiments of the present disclosure are directed to automatically marking (e.g., flagging) at least a first item listing as a candidate for removal as a search result in response to receiving an indication of a user selection (e.g., of a UI button) that is indicative of a user requesting removal of one or more item listings based on a particular attribute value (e.g., color or price) associated with the one or more item listings.

For example, some embodiments automatically mark and remove a plurality of item listings, as search results, based on receiving an indication that the user has requested removal of each item listing that belongs to a particular item category. In an illustrative example, a user may have first issued a query that includes the term "Mac." Various search results may then be rendered for the query. However, the user may desire to only receive item listings that belong to the category of "computer" (e.g., APPLE MACINTOSH computers), as opposed to the category of "beauty" (e.g., MAC Cosmetics). Accordingly, various embodiments can receive an indication that the user has selected a UI element that indicates that the user wants to remove each item listing that belongs to the "beauty" category from the search results. In this way, only item listings belonging to the "computer" category will be rendered, kept, and/or visible on a search result page.

In another example, some embodiments automatically mark and remove a plurality of item listings, as search results, based on receiving an indication that the user has requested removal of each items listing that has a particular aspect value (e.g., color, price, size, quantity, brand, version, etc.). In an illustrative example, a user may have issued a query that includes the terms "running shoes." However, the user may desire not to view item listings of shoes that are "black" in color or are the brand "ADIDAS." Accordingly, various embodiments can receive an indication that the user has selected a UI element that indicates that the user wants to remove each item listing, where corresponding running shoe items are black and are of the ADIDAS brand. In this way, only item listings that are not black (e.g., red and white) and not ADIDAS (e.g., NIKE) will be rendered, kept, and/or visible on a search result page.

In yet another example, some embodiments automatically mark and remove a plurality of item listings, as search results, based on receiving an indication that the user has requested removal of a first item listing and all other item listings that are similar to the first item listing. Such request may occur in situations where the user does not know exactly how to describe what the user does not like about an item listing (or even what the user likes). In an illustrative example, a user may have issued a query that includes the terms "rug." To execute this query, embodiments can render various item listings with that include associated images (e.g., digital photographs). However, after viewing the images, the user may desire to remove items listings of the search results where images show a particular undesirable pattern in a particular rug item listing. However, the user may not know the name of the pattern or how to describe it. Accordingly, various embodiments can receive an indication that the user has selected a UI element that indicates that the user wants to remove each item listing that includes a similar image (or the particular pattern in the image) of a currently selected item listing and responsively locate similar images (e.g., via a Convolutional Neural Network (CNN)). In this way, only item listings that do not have the particular pattern will be rendered, kept, and/or visible on a search result page.

Using this same illustration, some embodiments can execute the query that includes the term "rug" by rendering various item listings that include natural language descriptions (e.g., item titles or item descriptions) of the associated item. As described above, the user may desire to remove items listings of the search results that describe a particular pattern of a rug. Accordingly, various embodiments can receive an indication that the user has selected a UI element that indicates that the user wants to remove each item listing that includes a similar natural language description of a currently selected item listing. Various embodiments can responsively locate similar item listings via natural language processing (NLP) of the natural language description in the item listing. In this way, only item listings that do not have the particular natural language descriptions (or semantically similar descriptions) in the item listings will be rendered, kept, and/or visible on a search result page.

Various embodiments of the present disclosure improve existing search technologies by intelligently removing particular search results (or marking search results for removal) for a given query, thereby improving the user experience, as well as search engine accuracy. When users want to buy an item, for example, they may affirmatively indicate exclusion criteria or attribute values (e.g., item listings in a particular item category, items listings of items of a particular color, or item listings that are "similar") for search results they do not want rendered or kept as search results. Accordingly, the user does not have to drill down to various pages, spend lots of time browsing, scroll through various search results, generate multiple queries, or otherwise arduously and manually view several undesired or unwanted item listings because these undesired items listings will have already been excluded. Therefore, search engine accuracy and the user experience is improved.

Likewise, various embodiments improve user interface functionality of existing search technologies. As discussed above, existing user interfaces of search technologies render a list of ranked search results on various search result pages that are surfaced based on the inclusion results of a query. Accordingly, the user will have to drill down to at least a second search results page, scroll down to other search results, generate another query, or otherwise perform multiple clicks, selections, or input on these existing user interfaces, leading to arduous user navigation to get to the appropriate search results. However, various embodiments of the present disclosure include a single UI element (e.g., a button, drop down arrow, a pop-up menu) that causes removal of each (or a subset) of items listing associated with an attribute value (e.g., an item category, an aspect value, or "similar" items, as described above). Accordingly, the user does not have to drill down, perform multiple clicks, selections, or perform other input on these user interfaces because the single UI element can cause removal of multiple undesired items listings at once or in batch. Such single UI element also improves the user experience because it provides a simple and easy way to remove several undesired item listings in a single step or operation (as opposed to removing item listings in multiple steps or eventually locating relevant item listings after multiple user inputs).

Various embodiments of the present disclosure also improve computer resource consumption, compared to existing computers and search technologies. As described above, some existing search technologies allow users to delete individual search results one search result at a time, which increases storage device I/O. However, unlike these technologies, various embodiments remove multiple search results based on a single selection (e.g., of a UI element). At the I/O level, this means that the computing system has to reach out to disk a single time (as opposed to multiple times) to perform a delete operation on disk. In other words, for example, in response to receiving an indication that a user has selected a UI element to remove each item listing associated with a particular attribute value (e.g., belonging to a particular item category), various embodiments go to disk a single time to remove, in one batched operation, multiple item listings associated with the particular value, as opposed to going to disk multiple times each time a delete request is issued. Once a read/write head is positioned on disk, it can execute multiple delete operation requests so long as such delete operation requests are included in a single payload message. However, if there is only one delete operation requested (as is the case with existing search technologies), the read/write head has to continually reposition itself and perform a delete operation. Accordingly, various embodiments increase throughput, are less time consuming, are less error prone (due to fewer mechanical movements of a read/write head), and do not wear as much on I/O components, such as a read/write head, due to the single I/O operation. Further, as described above, because existing search technologies employ algorithms for only what will be included in search results, as opposed to adequate criteria for what will be excluded in search results, users have to keep redundantly generating multiple different queries or input to receive relevant search results, which also increases I/O because of the multiple inputs that must be processed. However, various embodiments employ functionality that allows users to specify particular attribute values or exclusion criteria for what will be excluded in search results, thereby negating the need for generating redundant inputs and thus constant I/O.

As described above, existing technologies are also costly in terms of throughput or network latency based on the functionality of employing only inclusion criteria in queries for search results. However, various embodiments improve throughput or network latency because an optimizer engine of a database manager module has to generate a query execution plan fewer times relative to existing technologies (e.g., once for an original query) because only a single selection (e.g., of a UI element) may be needed to exclude several search results in parallel, as opposed to a user needing to issue multiple queries to find suitable search results, thereby causing an optimizer engine to be redundantly and extensively utilized.

Various embodiments also improve computer network packet generation costs, which also improves network latency and network utilization. As described above, existing search technologies require the generating of redundant inputs, queries, or delete requests of individual search results, which causes excessive packet generation costs that adversely affect computer network communications. However, as describe herein, various embodiments adequately remove particular search results (or mark search results for removal) for a given query. This means that less packets in TCP/IP and other protocol networks are traversing over a network because there are fewer queries, selections, delete requests, or other user inputs based on exclusion criteria being able to be defined to delete multiple search results at a single time. Accordingly, for example, packet formulation is not multiplied by all these inputs needed to obtain the desired search results.

FIG. 1 is a block diagram of an illustrative system architecture 100 in which some embodiments of the present technology may be employed, according to some embodiments. Although the system 100 is illustrated as including specific component types associated with a particular quantity, it is understood that alternatively or additionally other component types may exist at any particular quantity. In some embodiments, one or more components may also be combined. It is also understood that each component or module can be located on the same or different host computing devices. For example, in some embodiments, some or each of the components within the system 100 are distributed across a cloud computing system (e.g., the computer environment 1100 of FIG. 11). In other embodiments, the system 100 is located at a single host or computing device (e.g., the computing device 1200 of FIG. 12). In some embodiments, the system 100 illustrates executable program code such that all of the illustrated components and data structures are linked in preparation to be executed at runtime.

System 100 is not intended to be limiting and represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For instance, the functionality of system 100 may be provided via a software as a service (SAAS) model, e.g., a cloud and/or web-based service. In other embodiments, the functionalities of system 100 may be implemented via a client/server architecture.

The system 100 is generally directed to marking and removing one or more items listings as search results and causing presentation of one or more UI elements associated with the marking and removing. The system 100 includes an item listing aspect value determiner 102, an item listing category determiner 104, an item listing similarity determiner 106, a query processor 108, an item listing remover 114, a presentation component 112, and storage 125, each of which are communicatively coupled to the network(s) 110. The network(s) 110 can be any suitable network, such as a Local Area Network (LAN), a Wide Area Network (WAN), the internet, or a combination of these, and/or include wired, wireless, or fiber optic connections. In general, network(s) 110 can be any combination of connections (e.g., APIs or linkers) or protocols that will support communications between the components of the system 100.

In some embodiments, the item listing aspect value determiner 102, the item listing category determiner 104, and/or the item listing similarity determiner 106 performs its functionality offline (e.g., not in response to any runtime query request). For example, in "offline" embodiments, the item listing similarity determiner 106 can analyze various predefined or predetermined historical query/title pairs (e.g. located in storage 125) and can train, via a machine learning model, on such query/title pairs. In some embodiments, the query processor 108, the item listing remover 112, and/or the presentation component 114 alternatively performs its functionality online (e.g., in response to a runtime query request).

The item listing aspect value determiner 102 is generally responsible for determining which aspects (and/or aspect values) associated with a given item listing will be marked as selectable by a user, as part of exclusion criteria indicated by the user. Additionally, in some embodiments, the item listing aspect value determiner 102 stores, to the storage 125, a mapping (e.g., a data structure) of the marked aspects that associates the marked aspects with each item listing. In this way, when the query processor 108 accesses storage 125 at runtime, the item listings will be marked with the selected aspects by the item listing aspect value determiner 102. Subsequently, the item listing remover 114 can remove the corresponding items based on a user selected of the selected aspects, as described in more detail below.

An "aspect value" as described herein refers to any attribute value that partially describes and/or is a component of an item listing (and/or the item listing's associated item). For example, an aspect value can be the color of an item, a size (e.g., small, medium, large, shoe size) of an item, a price or cost of an item for sale, a quantity of items, a shipping service indicated in a particular item listing (e.g., free shipping, overnight shipping, standard shipping, etc.), a brand of an item, a version or model number of an item (e.g., WINDOWS 7 versus Windows 10), a condition of an item indicated in an item listing (e.g., new versus used), a weight of an item, and/or one or more dimensions (e.g., length, width, and/or height) of an item.

In some embodiments, an "item listing" as described herein refers to a description (e.g., in natural language) and/or indication (e.g. a photograph) of an item that is for sale in an electronic marketplace. For example, the item listing can include an image that represents an item for sale and an item title that summarizes key attributes of the item for sale, such as a name and price of an item. An "item" in these embodiments is the tangible real world product or good and/or service that is for sale at an electronic marketplace. Alternatively or additionally, an item listing refers to a document, file, link, web page, identifier, or any search result that indicates the item listing's source (e.g., a URL in a web browser search engine).

An "electronic marketplace" as described herein refers to any mobile app, web application (e.g., an e-Commerce web application), or any suitable computer application that includes functionality for executing users' requests or queries to purchase one or more items. In some embodiments, an electronic marketplace facilitates consumer-to-consumer transactions (e.g., private seller to private buyer). Alternatively or additionally, the electronic marketplace facilities business-to-consumer transactions. In some of these embodiments, entities (e.g., corporations) may provide item listings describing items on their website for consumer purchase without letting private sellers sell items. It is understood that an electronic marketplace need not refer to the entire or main functionality of a given application. Rather, an electronic marketplace can refer to a particular set of routines, functions, or portion of a larger application. For example, a web application may correspond an education web application that allows users to sign up for classes, while at the same time including an electronic marketplace to purchase items (e.g., books).

In some embodiments, the item listing aspect value determiner 102 determines which aspects or aspect values will be marked as selectable by a user based on determining which aspect value (and/or aspect) of an item listing meets a threshold for describing the item listing. The "threshold" may correspond to any suitable type and value, such as a particular distance (e.g., cosine distance), entropy difference, union difference (e.g., via Jaccard Index), and the like. In an illustrative example, there may be several item listings that describe the same item for sale. Each item listing may have various aspect values that makeup the item listing. However, not all aspect values of each item listings may be identical, while some aspect values are all the same. For example, there may only be one color of an item for sale and so the aspect values would be the same for each item listing, while in other situations there may be multiple colors of an item for sale. Accordingly, some embodiments can calculate the union or overlap of all aspect values between all item listings for this same item via, for example, the Jaccard Index—

$$J(A, B) = \frac{|A \cap B|}{|A \cup B|} = \frac{|A \cap B|}{|A| + |B| - |A \cap B|}$$

This represents the number in both sets A and B divided by the number in either set (and multiplying by 100), which indicates the amount of overlap or similarity between the sets. In these embodiments, the "threshold" corresponds to a union or overlap threshold. Accordingly, for example, if more than two item listings sold the same item for sale in at least two (e.g., the threshold) different colors, various embodiments would mark the attribute value of the particular colors as being selectable by a user (and/or mark the attribute of "color" so that users can select the corresponding attribute values).

In some embodiments, the item listing aspect value determiner 102 alternatively or additionally utilizes entropy-based calculations. "Entropy" in the context of the present disclosure indicates the randomness or distribution of a particular aspect's different aspect values for a particular item over all the associated item listings. The more that item listings of an item share or include the same aspect values, the less random and less distributed they are. Likewise, the more that item listings of the item have variable or different aspect values, the more random and distributed it is. Various embodiments select aspects that are more random or have aspect values that are well-distributed across various listings (e.g., an item is sold in several colors for several item listings), so that users can request removal of item listings that have a particular aspect value (e.g., a black color).

Likewise, various embodiments do not select aspects whose aspect values are not well-distributed (e.g., an item is only sold in one color) or not used for particular item listings because the user will not be able to select them for removal, for example.

To calculate entropy, various embodiments calculate the difference between entropy of one or more aspect values and the ideal entropy, and select a quantity (e.g., the first three) of corresponding aspects with the smallest difference (i.e., the smallest entropy) of values. Such "selection" may be indicative of marking them as selectable by a user at runtime for removal. Put another way, entropy can be defined as the absolute value of candidate entropy (i.e., aspect value entropy) minus ideal entropy. In these embodiments, the selected aspects (or aspect values) are the aspects whose aspect values contain entropy that is closest to the ideal one.

Assuming that there are N items, it is assumed in some entropy-based embodiments that there is an aspect X that has M=$\sqrt{N}$different aspect values, and each aspect value corresponds to $$n = \frac{N}{M} \text{ items.}$$

Accordingly, in these embodiments, "ideal entropy" may be calculated by:

$$\text{Ideal Entropy} = -\sum_{i=1}^{M}\left(\frac{n}{N} * \text{Log}\left(\frac{n}{N}\right)\right).$$

Responsive to calculating ideal entropy, for each aspect some embodiments calculate the entropy of all of its aspect values (i.e., the candidate entropy). Candidate entropy can be calculated in any suitable manner. For example, candidate entropy can be calculated for a random variable X with k in K discrete states as follows: H(X)=−sum(each k in K p(k)*log(p(k))). That is, the negative of the sum of the probability of each event or aspect value multiplied by the log of the probability of each event or aspect value. Responsively, some embodiments then calculate the difference between the ideal entropy and the candidate entropy, and select a quantity (e.g., three) of corresponding aspects with the smallest difference of aspect values. For example, using these entropy-based calculations, embodiments can select aspects of "color," "size," and "brand" for a particular shoe item and associated item listings based on the entropy of the corresponding aspect values being the smallest in difference to the ideal entropy (e.g., color being the most variable or well-distributed among all item listings by having multiple color options), and not select particular aspects (e.g., "quantity"), because there is a larger difference to the ideal entropy (e.g., these aspect values are not as variable or well-distributed among all item listings because there are not as many color options).

In various embodiments, in response to the item listing aspect value determiner 102 selecting a particular quantity (e.g., three) of aspects for a given item, the item listing aspect value determiner 102 can flag or mark the selected aspects and its values as being selectable by a user to remove item listings that include particular aspect values of such selected aspects. In some embodiments, such marking includes storing, in a data structure, the selected aspects in preparation for runtime functionality to service query requests for associated item listings. For example, the item listing aspect value determiner 102 may map the selected aspects to item listings in storage 125. In response to a query for the items that include the selected aspects, the query processor 108 may then access these mapped item listings in storage 125 and/or programmatically call or otherwise communicate with the presentation component 114. Such communication may occur so that the presentation component 114 can cause these selected aspect values to be selectable by a user (e.g., via a UI button), which is described in more detail below.

The item listing category determiner 104 determines a category that one or more items listings belong to or fall under. Additionally in some embodiments, the item listing category determiner 105 stores, to the storage 125, a mapping of the determined categories that associates the determined categories with each item listing. In this way, when the query processor 108 accesses storage 125 at runtime, the item listings will be marked with the category determinations. Subsequently, the item listing remover 114 can remove the corresponding items, as described in more detail below.

Examples of item listing categories include a product category, an industry category, and a brand category. For instance, if an item listing includes the phrase "HONDA 9.92 stroke" the product category may be defined as "boat motor" and the industry category may be indicated as "marine."

In some embodiments, the item listing category determiner 104 determines the category based on analyzing or generating a predefined mapping, such as a data structure, that maps the item listing to the category. For example, the item listing category determiner 104 can analyze a lookup table or hash map, where the key is the item listing and the value is the identifier that indicates the category. Alternatively or additionally the item listing category determiner 104 uses NLP or machine learning models to determine the category (e.g., via WORD2VEC, BERT, etc.). NLP may determine the semantic relationships between terms in an item listing and other words in a data set (e.g., a vocabulary). Determining semantic relationships includes determining what words have a same or similar (e.g., within a threshold distance when the word represent vectors) meaning even if they are syntactically different. "Syntax" or syntactic properties refers to the structure of character sequences of the content (as opposed to the semantics or meaning), such as the structure of a sentence. For example, "car" and "far" are syntactically similar but have two different definitions so they are not semantically similar. Rather, "far" and "distant" are semantically similar because they mean the same thing, even though they are structurally or syntactically different.

In some embodiments, NLP utilizes tokenization functionality to tokenize item listings into their constituent words and some or each of the words are tagged with a part-of-speech identifier. "Tokenization" or parsing in various embodiments corresponds to a computer-implemented process that segments the content into words, sentences, symbols, character sequence, and/or other elements of the content. This can include a set of rules for analyzing a message, such as word and/or part of speech (POS) order. For example, for the sentence "the girl jumped happily", the syntax may correspond to a word order where the structure is subject-verb-adverb (or subject, verb, object, etc.). In various embodiments, each word of a query and search result candidate are tagged with such POS identifiers.

In some embodiments, NLP derives semantic and syntactic content of semi-structured or unstructured data (e.g., data in image files, data in blogs, posts, websites, text descriptions of classifier models, etc.). This is in contrast to analyzing "structured" data, such as data in a database. NLP can be configured to parse content to determine semantic context (e.g., meaning of words by analyzing each word in the content against each other and against training data) and syntax context (e.g., the set of rules that govern structure of sentences in a given language). NLP is configured to recognize keywords, contextual information, and metadata tags associated with one or more portions of a set of data. In certain embodiments, NLP analyzes summary information, keywords, text descriptions included in the set of data, and uses syntactic and semantic elements present in this information to identify the interest contexts. The syntactic and semantic elements can include information such as word frequency, word meanings, text font, italics, hyperlinks, proper names, noun phrases, parts-of-speech (e.g., noun, adverb, adjective, and the like) and/or the context of surrounding words. Other syntactic and semantic elements are also possible. In this way, for example, the item listing category determiner 104 can determine that the term "Apple" in an item listing is semantically similar to a "computer brand" (e.g., a type of category) even though they are syntactically different and even though it can refer to a fruit in some cases.

In some embodiments, the item listing category determiner 104 additionally or alternatively uses other NLP-based functionality, such as Named Entity Recognition (NER). NER is an information extraction technique that identifies and classifying elements or "entities" in natural language text into predefined categories. Such predefined categories may be indicated in corresponding tags or labels. In various embodiments, NER (and NLP in general) thus transforms unstructured data to data that is structured, and therefore machine-readable and available for processing. Entities can be, for example, names of people, specific organizations, specific locations, specific times, specific quantities, specific monetary values, specific percentages, and the like. Likewise, the corresponding tags or labels can be "people," "organizations," "location," "time" and the like. In this context of the present disclosure, these tags or labels can indicate whether entities or words refer to a particular category based on NER.

In an illustrative example, there may be an item title called "APPLE IPHONE 7 case beautiful NIB." An in item title describes an item that is (or has been or will be) for sale in an electronic marketplace. According to various embodiments, the NER functionality can tag this item title as follows "APPLE [brand], IPHONE [model], case [accessory], beautiful [x], NIB [x]. The tag "[model]" can alternatively be "[item]" in some embodiments. In various embodiments, the [x] tags are machine-readable indicators to a computer to remove such terms for further processing (e.g., placing as inputs into a classifier or word embedding). For example, a 200-dimensional feature vector for the item title illustrated above, where the item title is converted into "APPLE IPHONE 7 case" by removing the words with the "[x]" tag. This way, for example, the item listing category determiner 104 can generate or receive word embeddings for "APPLE" "IPHONE7" and "case," as opposed to the entire item title.

Using the example above, the item listing category determiner 104 can generate, for example, a 50-dimensional tag feature vector for the item title with POS tagging (e.g., as described above). Accordingly, based on NER, "APPLE," "IPHONE7", and "case" is tagged or embedded in a word embedding as "brand_apple", "model_iphone7", and "accessory_case." This may be indicative of an item listing category being a phone case, as opposed to a phone itself.

In some embodiments, the item listing category determiner 104 additionally or alternatively uses word embeddings to perform its functionality (e.g., even without NER functionality). In this way, different words or other characters in items listings can be converted into feature vectors of numerical values and embedded in feature space based on how semantically similar (e.g., via cosine or Euclidian distance) each word or other character sequence is to each other. In various embodiments, such word embeddings are produced by WORD2VEC, GloVe, and/or any other suitable word embedding models. Word embeddings are described in more detail below.

The item listing similarity determiner 106 is generally responsible for determining whether a first item listing is similar to at least a second item listing (and in some embodiments, the magnitude of the similarity (e.g., in terms of distance)). Additionally in some embodiments, the item listing similarity determiner 106 stores, to the storage 125, a mapping of one or more item listings and one or more other item listings that are similar to the one or more listings. In this way, when the query processor 108 accesses storage 125 at runtime, the item listing remover 114 can remove the corresponding item listings and the item listings' similar item listings, as described in more detail below.

The image similarity module 106-1 is generally responsible for determining whether one or more images within the first item listing is similar to at least a second image in at least the second item listing. In some embodiments, this occurs via any machine learning functionality. For example, the image similarity module 106 can use a CNN, or other deep learning model (e.g., ResNet-50, Xception, Inception V3, VGG19, VGG16, etc.), as described in more detail below. Other examples include using various hashes to detect image similarity. Examples include dHash, aHash, pHash, wHash. These examples refer to a perceptual hash. A perceptual hash is a generated string (hash) that is produced by the specific algorithm (e.g., dHash). This perceptual hash is a fingerprint of an input image that can be used to compare other images by calculating a distance (e.g., Hamming distance) to count the number of different individual bits.

In an illustrative example, dHash is a Python library that generates a "difference hash" for a given image (i.e., a perceptual hash based on Neal Krawetz's dHash algorithm). Using dHash, a first hash of the first image may be computed, using this algorithm, as 101100110011001. Then a second hash of the second image may be computed, which may be the same value. Accordingly, based on the hash value matching or being the same, the image similarity module 106-1 indicates that the two images are "similar."

The text similarity module 106-2 is generally responsible for determining whether one or more natural language characters (e.g., words, numbers, symbols, etc.) within the first item listing is similar to at least a second set of natural language characters in at least the second item listing. In some embodiments, the text similarity module 106-2 uses identical or similar NLP functionality and models described with respect to the item listing category determiner 104. For example, some embodiments use NER and semantic similarity analysis to determine whether the natural language character sets are semantically similar regardless of their syntactic structure or similarity and/or use NLP-based models (e.g., WORD2VEC or BERT).

In some embodiments, the text similarity module 106-2 alternatively or additionally uses text hash algorithms to perform its functionality. For example SimHash and/or MinHash algorithms may be used. These text hash algorithms typically assign pseudo-random value/buckets to objects. Hash functionality are typically uniform, in that each bucket is equally likely. Locality Sensitive Hashing (LSH) is a hashing based dimensionality reduction method that preserves item similarity. LSH hashes items to Kk buckets such that similar natural language characters map to the same bucket with high probability. SimHash approximates cosine similarity, whereas MinHash approximates Jaccard similarity.

For example, in Simshash, some embodiments convert the natural language characters of an item listing to a first feature vector to generate a feature weight, which is then converted or encoded into a hash weight, and then its placement in vector space is computed in order to determine the cosine distance between other vectors representing natural language characters of other item listings. If the cosine distance between any two vectors representing hashes of natural language characters are within a threshold distance, then those natural language characters may be marked by the item listing similarity determiner 106 with the same (or similar) hash and may be determined as "similar". In an illustrative example, a first item listing may include the title "Hand-knotted Carpet 4'8"×9'" Traditional Wool Rug." A second item listing may include the title "Hand-knotted Carpet 5'0"×6'6" ordered Geometric, Traditional wool Rug." These natural language characters are then converted into a feature vector and oriented in feature space (e.g., based on the Simhash algorithm). Subsequently, the SimHash value vector after term weighting may be the same for each of these item listings (e.g., 0100110111100010). This is notwithstanding there are different dimensions for these rugs and different characters (e.g., "ordered geometric") because most of the characters are the same and therefore the distance between the hashes will be within a threshold and be considered similar.

In some embodiments, the text similarity module 106-2 (and/or the image similarity module 106-1) alternatively or additionally uses exact text/image matches to perform its functionality. In these embodiments, the text similarity module 106-2 compares the natural language characters, aspect values, and/or any portion of an item listing with another set of natural language characters, aspect values, and the like of another item listing. If they are the same or match, then they are marked as "similar" by the item listing similarity determiner 106. Any suitable algorithm can be used in these embodiments, such as strict Jaccard Index functionality to determine the percentage overlap of terms/images. Other examples include Naïve string-search algorithm, Optimized Naïve string-search algorithm, Rabin-Karp algorithm, Knuth-Morris-Pratt algorithm, Boyer-More string-search Algorithm, and Bitmap algorithm, among others.

The query processor 108 is generally responsible for executing a query (e.g., via query optimizer, selectivity, and cardinality) at runtime in order to rank and render search results according to the query. The search result ranker 107 ranks item listings as search results based on terms in a query. Any suitable search engine functionality may be employed for ranking. For example, algorithms used by the search result ranker 107 may be or include: TF-IDF, WORD2Vec, PageRank (PR) algorithm, and the like. The pre-fetch component 108-2 is responsible for fetching additional item listings that are caused to be displayed or rendered in response to receiving an indication that one or more original item listings rendered via the query have been removed (e.g., by the item listing remover 114), which is described in more detail below.

In some embodiments, the query processor 108 fetches the item listings in storage 125, which have been marked (e.g., tagged) and stored by the item listing aspect valued determiner 102, the item listing category determiner 104, and/or the item listing similarity determiner 106, as described above. In this way, for example, when the query processor 108 fetches a first item listing, the first item listing will be: marked or tagged with particular aspect values selectable by a user for removal, marked or tagged with a category identifier, and/or supplemented with similar item listings. Alternatively, in some embodiments, the query processor 108 dynamically generates such information on-the-fly (i.e., it is not predetermined in the storage 125) depending on what the query and search results are. For example, in response to receiving a query for a particular t-shirt, the query processor 108 may fetch all relevant item listings and determine which color (or other aspect values) are indicated in the search result set. Responsively, the query processor 108 may generate, on a search result page, identifiers that indicate each color that the corresponding item is available in that is part of the current search result set.

The presentation component 112 is generally responsible for causing presentation (e.g., display) of data on a user device. In some embodiments, such presentation is in the form of a user interface. Such user interface may be a graphical user interface (GUI), and/or a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on a user device.

In some embodiments, the presentation component 112 causes presentation of content and related information to user devices, such as a search result page based on the functionality of the item listing aspect value determiner 102, item listing category determiner 104, the item listing similarity determiner 106, and/or the query processor 108. The presentation component 112 may comprise one or more applications or services on a user device, across multiple user devices, or in the cloud. For example, in one embodiment, presentation component 112 manages the presentation of content to a user across multiple user devices associated with that user. Based on content logic, device features, associated logical hubs, inferred logical location of the user, and/or other user data, presentation component may determine on which user device(s) content is presented, as well as the context of the presentation, such as how (or in what format and how much content, which can be dependent on the user device or context) it is presented and/or when it is presented.

In some embodiments, the presentation component 112 generates user interface features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. In some embodiments, the presentation component 112 generates structured data, tagged data or otherwise causes presentation of structured or tagged data that was previously unstructured, semi-structured, or untagged.

The presentation component 112 includes the removal indicator 112-1, the aspect value selection indicator 112-2, the category selection indicator 112-3, the similarity selection indicator 112-4, and the masking indicator 112-5. The removal indicator 112-1 is a UI element (e.g., button, field, drop-down menu) that is user selective and is indicative of a user request to remove one or more item listings rendered by the query processor 108. The aspect value selection indicator 112-2 is a UI element (e.g., button, field, drop-down menu) that is user selectable and is indicative of a user request to remove one or more item listings rendered by the query processor 108 that have a particular aspect value. The category selection indicator 112-3 is another UI element that is user selectable and is indicative of a user request to remove one or more item listings rendered by the query processor 108 that fall under a particular query. The similarity selection indicator 112-4 is a fourth UI element that is user selectable and is indicative of a user request to remove one or more item listings that are similar to one or more of the item listings rendered by the query processor 108. The masking indicator 112-5 refers to a mask or other marking to indicate that a particular item listing has been selected as a candidate for removal. It is understood that the presentation component 112 need not include all of the UI elements 112-1, 112-2, 112-4, and 112-5. Rather, in some embodiments, there may be only a single UI element representing these UI elements.

The item listing remover 114 is generally responsible for marking (e.g., via the masking component 114-4) one or more item listings provided as search results by the query processor 108 as candidates to remove and further actually removing those items listings from the search results. To "mark" an item listing as a candidate for removal (or any "marking" described herein) can include any suitable functionality. For example, marking can include generating a: mask, flag, a tag, label, index, metadata or other indicator that indicates that an item listing is a candidate for removal. In some embodiments, marking can alternatively or additionally include storing, in memory, the corresponding item listing and structuring (e.g., providing a record for and indexing) it so that it can be retrieved at a later time, which is described in more detail below. The masking component 114-4 is generally responsible for the marking of an item listing as a candidate for removal.

In some embodiments, the item listing remover 114 marks and removes item listings as search results based on functionality performed by the item listing aspect value determiner 102, the item listing category determiner 104, and/or the item listing similarity determiner 106. In these embodiments, for example, the item listing remover 114 can directly access the marked item listings produced by the query process 108, and/or programmatically call the item listing aspect value determiner 102, the item listing category determiner 104, and/or the item listing similarity determiner 106 in order to remove additional item listings than those selected by the user based on the specific functionality of these components.

In some embodiments, the item listing remover 114 only removes item listings that were rendered by the query processor 108. Alternatively or additionally, in some embodiments, the item listing remover 114 removes item listings that were not rendered by the query processor 108. In these embodiments, the item listing remover 114 can programmatically call the item listing aspect value determiner 102, the item listing category determiner 104, and/or the item listing similarity determiner 106 to find the corresponding item listings in storage 125.

The aspect value locator 114-1 is generally responsible for locating item listings (e.g., produced by the query processor 108 or in storage 125) that have a particular aspect value in response to receiving an indication that a user has requested removal of one or more listings that include the particular value. In response to such locating, the item listing remover 114 removes the item listings that have the particular value. In an illustrative example, a user may have issued a query that includes the terms "running shoes." However, the user may desire not to view item listings of shoes that are "black" in color or are the brand "ADIDAS." Accordingly, the aspect value locator 114 can receive, via the presentation component 114, an indication that the user has selected the aspect value indicator 112-2 that indicates that the user wants to remove each item listing, where corresponding running shoe items are black and are of the ADIDAS brand. In response to the receiving of this indication, the aspect value locator 114-1 can locate each item listing where an item is "black" and are "ADIDAS" brand. Responsively, the item listing remover 114 can remove such listings where these are the attributes.

The category locator 114-2 is generally responsible for locating item listings (e.g., produced by the query processor 108 or in storage 125) that belong to a particular category in response to receiving an indication that a user has requested removal of one or more listings that belong to the particular category. In response to such locating, the item listing remover 114 removes the item listings that belong to the particular category. In an illustrative example, a user may have issued a query that includes the term "Mac." However, the user may desire to only receive item listings that belong to the category of "computer," as opposed to the category of "beauty". Accordingly, the category locator 114-2 can receive an indication that the user has selected the category indicator 112 that indicates that the user wants to remove each item listing that belongs to the "beauty" category. In response to the receiving of this indication, the category locator 114-2 can locate each item listing where an item belongs to a "beauty" category. Responsively, the item listing remover 114 can remove such listings that belong to this category.

The similarity locator 114-3 is generally responsible for locating item listing(s) (e.g., produced by the query processor 108 or in storage 125) that are similar to a currently user-selected item listing in response to receiving an indication that a user has requested removal of one or more listings that are similar to a currently-selected item listing. In response to such locating, the item listing remover 114 removes the item listings that are similar. In an illustrative example, a user may have issued a query that includes the terms "rug." To execute this query, embodiments can render various item listings with that include associated images (e.g., digital photographs). However, after viewing the images, the user may desire to remove items listings of the search results where images show a particular undesirable pattern in a particular rug item listing. Various embodiments can receive an indication that the user has selected the similarity indicator 112-4 that indicates that the user wants to remove each item listing that includes a similar image (or the particular pattern in the image) of a currently selected item listing and responsively locate similar images (e.g., via a Convolutional Neural Network (CNN)). In response to receiving this indication, the similarity locator 114-3 can search for and fetch similar item listings. Responsively, the item listing remover 114 removes these similar item listings.

In some embodiments, the item listing remover 114 removes item listings in a current search session based on search results produced by the query processor 108. Additionally or alternatively, in some embodiments, the item listing remover 114 removes items listings for future sessions. In this way, when the query processor 108 executes a particular query, it affirmatively does not rank (via the search result ranker 108) or render those item listings that have been removed by the item listing remover 114 in a prior session. In some embodiments, the query processor 108 generates, and causes presentation of (via the presentation component 112) of, a notification that indicates the particular attributes (e.g., category, aspect values, and/or similarity) and/or item listings that the user has selected in a prior session for removal (and/or indicates the actual item listings that were removed). Additionally, in some embodiments, such notification includes selectable UI elements so that the user can modify such removal criteria that was specified in a prior session. Such notification and features have utility in case the user changes her mind on what she wants excluded or otherwise changes exclusion filters for different queries or purchases.

Figure 2:
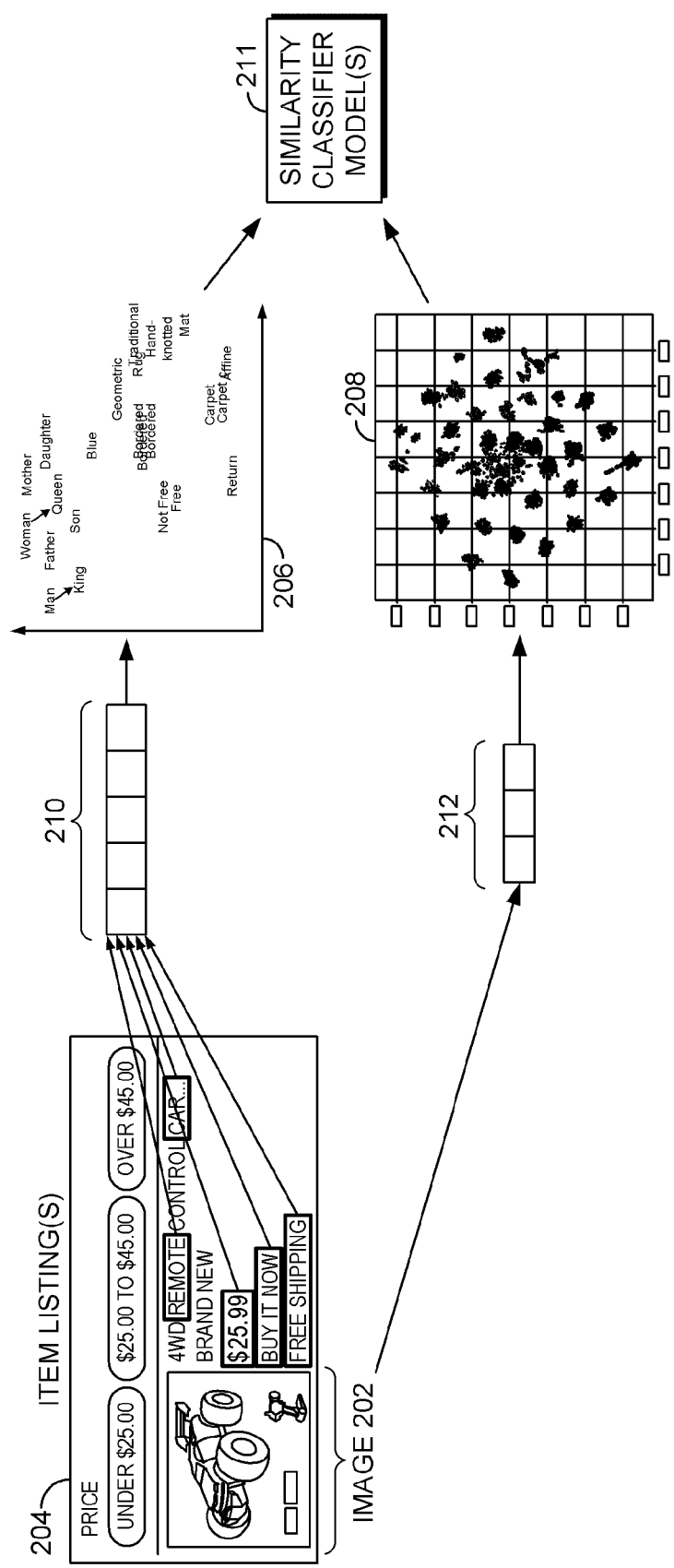
FIG. 2 is a schematic diagram illustrating how item listings are predicted to be similar using multiple machine learning models, according to some embodiments.

FIG. 2 is a schematic diagram illustrating how item listings are predicted to be similar using multiple machine learning models, according to some embodiments. In some embodiments, FIG. 2 represents functionality performed by the item listing similarity determiner 106 of FIG. 6.

As illustrated in FIG. 2, different attribute values, such as natural language characters (e.g., "free shipping" and "$25.99") from the item listing 204 are extracted, tokenized, and converted by a first machine learning model (e.g., a BERT model) into a feature vector 210 that is embedded in the embedding 206, which is described in more detail below. In this way, for example, embodiments can receive the natural language characters and determine a distance (e.g., a Euclidian distance) between the feature vector 210 representing the natural language characters and another set of feature vectors representing trained words or words sequences. Responsively, in some embodiments the first machine learning model selects one or more feature vectors that are within a threshold distance to the feature vector 210. For example, a first set of feature vectors representing a first set (e.g., 15) of item listings may be closest in distance to the feature vector 210. In some embodiments, the first machine learning model provides, as output, the first set of vectors and their distances to the one or more similarity classifier model(s) 211. The first set of feature vectors, which correspond to the first set of item listings are subsequently marked as candidates for being similar to the item listing 204.

A "feature vector" (also referred to as a "vector") as described herein includes one or more real numbers, such as a series of floating values or integers (e.g., [0, 1, 0, 0]) that represent one or more other real numbers, a natural language (e.g., English) word and/or other character sequence (e.g., a symbol (e.g., @, !, #), a phrase, and/or sentence, etc.). Such natural language words and/or character sequences correspond to the set of features and are encoded or converted into corresponding feature vectors so that computers can process the corresponding extracted features.

As illustrated in FIG. 2, the image 202 of the item listing 204 is also converted by a second machine learning model (e.g., via a CNN) from pixels into a feature vector 212 and embedded in the feature space 208, which is described in more detail below. In this way, for example, embodiments can receive the image 202 and determine a distance (e.g., a Cosine distance) between the feature vector 212 representing the image and another set of feature vectors representing trained item listing images. Responsively, in some embodiments the second machine learning model selects one or more feature vectors that are within a threshold distance to the feature vector 212. For example, a second set of feature vectors representing a second set (e.g., 20) of item listings may be closest in distance to the feature vector 212. In some embodiments, the second machine learning model provides, as output, the second set of feature vectors and their distances to the one or more similarity classifier model(s) 211. The second set of feature vectors, which correspond to the second set of item listings are subsequently marked as candidates for being similar to the item listing 204.

The one or more similarity classifier models 211 are generally responsible for taking, as input, the output of the first machine model (associated with feature space 206) and the output of the second machine learning model (associated with the feature space 208) and predicting or classifying which item listings are similar to the item listing 204. In some embodiments, the classifier model(s) 211 represent a third machine learning model, such as a classifier. In some embodiments, such machine learning model is multimodal, meaning that it processes different heterogeneous inputs, such as natural language characters (e.g., representing the natural language characters in the item listing 204) and images (e.g., representing the image 202). As described above, the similarity classifier model(s) 211 receive the first set of feature vectors as a first set of similarity candidates and the second set of feature vectors as a second set of similarity candidates.

The one or more similarity classifier model(s) 211 can select which candidates are similar according to any suitable manner. In some embodiments, a naïve algorithm can be implemented where the classifier model(s) 211 classifies all of the first set of candidates and the second set of candidates as "similar" (and by implication, the associated item listings) with a score or confidence indicator that indicates the particular distance and de-duplicating or deleting the same item listings found between the first and second models. Alternatively or additionally, the similarity classifier model(s) 211 may set its own distance threshold that acts as a secondary filter to reduce the quantity of candidates even further to only those immediately closest to the item listing 204. Alternatively or additionally, the classifier model(s) 211 can dynamically weight or score particular item listings depending on a combination of the specific distances of the associated feature vector candidates to both the feature vector 210 and 212 representing the item listing 204. In these embodiments, the first model and second model may additionally produce an identifier that represents an ID of an item listing associated with the feature vectors so that a mapping can be done for feature vectors representing an image and feature vectors representing natural language characters, but which belong to the same item listing. In an illustrative example of these embodiments, a first item listing may have a first image that is represented by feature vector A and a first natural language character sequence represented by feature vector A'. Likewise, a second item listing may have a second image that is represented by feature vector B and a second natural language character sequence represented by B'. Feature vector A may be much closer in distance to feature vector 210 than feature vector B. Therefore feature vector A may have integer score 20 and feature vector B may have integer score 5. However, feature vector B' may be slightly closer to feature vector 212 than A'. Therefore feature vector B' may take on a score of 10 and feature vector A' may take on a score of 8. The integers may be added together or otherwise aggregated for the same item listing by mapping the scores to the item listing ID—the first item listing score is 28 (20+8) and the second item listing sore is 15 (5+10). Accordingly, the first item listing may be determined to be more similar to item listing 104 relative to the second item listing because its overall score (representing its overall distance) is higher. Or in some embodiments, the first item listing may be classified as "similar," whereas the second item listing is not classified as similar.

Figure 3:
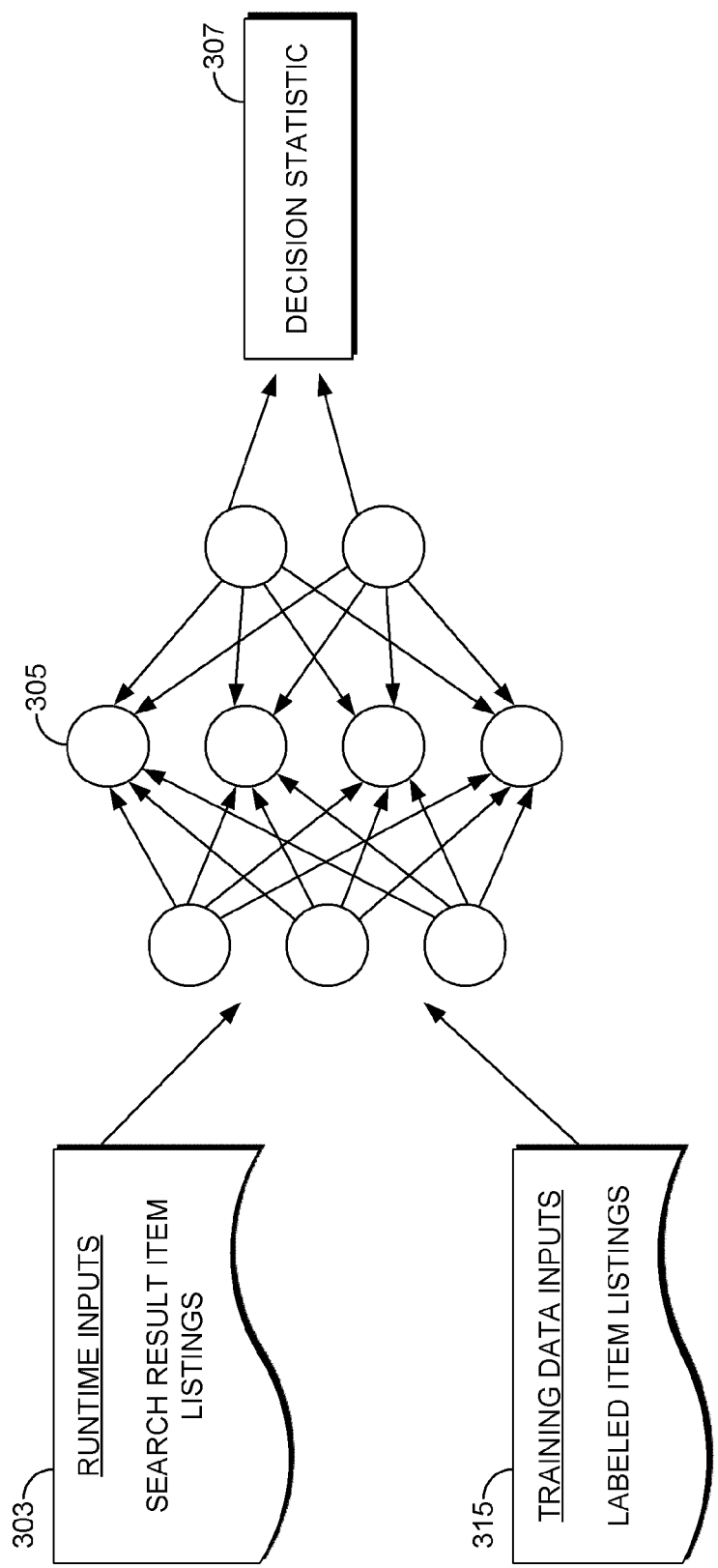
FIG. 3 is a schematic diagram illustrating how a decision statistic is generated using one or more machine learning models, according to some embodiments.

FIG. 3 is a schematic diagram illustrating how a decision statistic is generated using one or more machine learning models, according to some embodiments. In some embodiments, FIG. 3 represents the data and functionality used by the item listing similarity determiner 106. In some embodiments, FIG. 3 represents functionality performed by the first machine model (associated with the feature space 206) and/or the second machine learning model (associated with the feature space 208), as illustrated in FIG. 2.

FIG. 3 illustrates that one or more of the runtime input(s) 303 are fed or processed through the machine learning model(s) 305 to make a prediction, such as whether item listings are similar. Although the runtime input(s) 303 indicate specific inputs, they are representative only and more or fewer inputs may be used.

The one or more machine learning models 305 generates one or more particular decision statistic predictions 307 (e.g., a classification prediction of a classifier model, a clustering prediction of a clustering model, or a regression prediction for a regression model) given the runtime input(s) 303. Such machine learning model(s) 305 may be any suitable model of any suitable type. For example, such machine learning model(s) can be supervised or unsupervised and can be or include a neural network (e.g., a Convolutional Neural Network (CNN) or Siamese Neural Network), decision trees, random forests, support vector machine, Naïve Bayes, and or clustering (e.g., K-means clustering). Accordingly, although the machine learning model(s) 305 is represented as a neural network, it is understood that any suitable machine learning model (or combination of models) can alternatively or additionally be used. In an illustrative example of the decision statistic(s) 307, the machine learning model(s) 305 may cluster or classify a feature vector representing some or all of the input(s) 303 in a cluster or group representing similar item listings.

In certain embodiments, the decision statistic(s) 307 may either be hard (e.g., membership of a class is a binary "yes" or "no") or soft (e.g., there is a probability or likelihood attached to the labels). Alternatively or additionally, transfer learning may occur. Transfer learning is the concept of re-utilizing a pre-trained model for a new related problem.

In some embodiments, the machine learning model(s) 305 converts or encodes the runtime input(s) 303 and/or training data input(s) 315 into corresponding feature vectors in feature space. In various embodiments, the machine learning model(s) 305 learn, via training, parameters or weights so that similar features are closer (e.g., via Euclidian or Cosine distance) to each other in feature space. In some embodiments, this training is done in supervised manner using a loss function (e.g. Triplet loss or GE2E loss) that try to map similar features into one classification or cluster. Training can occur on any suitable training data input(s) 315, such as item listings that are for sale at an electronic marketplace. Some or each of these item listings indicate whether images, natural language characters, and the like are indicative of particular items ("similar" item listings typically indicate whether the similar item listings refer to the same or similar item).

Various embodiments can represent one or more feature vectors representing the input(s) 315 in vector space by aggregating (e.g. mean/median or dot product) the feature vector values to arrive at a particular point in feature space. For example, in supervised learning contexts, a training component can receive a first item listing and a specific label, such as "Brand A, Model X, Rug" and the like that indicates that the attributes (e.g., an image and natural language characters) of the first item is indicative of a particular rug.

Embodiments, can then run the first item listing with the corresponding labels through the machine learning model(s) 305 so that different feature values and weights are learned according to the label. In this way, when item listings are received, corresponding weights or features can be learned.

In some embodiments, the training component of the machine learning model(s) 305 learns features from the training data input(s) 315 and responsively weights them during training. A "weight" in the context of machine learning represents the importance or significant of a feature or feature value for prediction. For example, each feature may be associated with an integer or other real number where the higher the real number, the more significant the feature is for its prediction. In some embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights proportionately reduce the value of the output. For instance, the more the value of the input increases, the more the value of the output decreases. Negative weights may contribute to negative scores.

In another illustrative example of the training component, some embodiments learn an embedding of feature vectors based on learning (e.g., deep learning) to detect similar features between training data input(s) 315 in feature space using distance measures, such as cosine (or Euclidian) distance. For example, each labeled training data input 315 is converted from string or other form into a vector where each value or set of values represents the individual features of the search result candidate or query in feature space. Feature space (or vector space) is a collection of feature vectors that are each oriented or embedded in space based on an aggregate similarity of features of the feature vector. Over various training stages or epochs, certain feature characteristics for each input(s) 315 can be learned or weighted. For example, for a first image in a first item listing representing a rug, the most prominent feature may be a first pattern, whereas other features change considerably or are not present, such as the color or size of the mg. Consequently, patterns of the first pattern can be weighted (e.g., a node connection is strengthened to a value close to 1), which is indicative of the label taking on this feature (whereas other node connections representing the second set of symptoms are weakened to a value closer to 0). In this way, embodiments learn weights corresponding to different features such that similar features found in inputs contribute positively for predictions.

In some embodiments, learning or weighting includes changing an embedding in feature space of a feature vector representing item listings as more training epochs occur. For example, after a first round or epochs of training, it may be unknown which of the extracted features are important for taking on a certain classification or prediction. Accordingly, each feature may take on equal weight (or close to equal weight within a threshold, such as a 2% changed weight) such that all of the input feature vectors are substantially close or within a distance threshold in feature space. However, after several rounds of training or any threshold quantity of training, these same feature vectors may adjust or change distances from each other based on the feature value similarity. The more features of two feature vectors that match or are within a threshold value, the closer the two feature vectors are to each other, whereas when features do not match or are not within a threshold value, the further away the two feature vectors are from each other. Accordingly, for example, a trained embedding may look similar to the feature space 500 of FIG. 5.

In various embodiments, subsequent to the machine learning model(s) 305 training on the training data input(s) 315 (and/or testing), the machine learning model(s) 305 (e.g., in a deployed state) receives the runtime input(s) 303. In various embodiments, In some embodiments, the input(s) 303 are automatically converted to one or more feature vectors and mapped in the same feature space as vector(s) representing the training data input(s) 315. Responsively, some embodiments determine a distance (e.g., a Euclidian distance) between the one or more feature vectors and other vectors representing the training data input(s) 315, which is used to generate the decision statistic(s) 307.

In an illustrative example of the decision statistic 307, a feature vector representing pixel values of the runtime input(s) 303 may be closest to a feature vector representing a Brand A, model X rug cluster or classification Accordingly, in this example, the decision statistic 307 may be a prediction that the item listing associated with the runtime input(s) 303 is classified as "Brand A, model X rug" (e.g., based on comparing features of the runtime item listing images to training images and/or comparing features of the runtime item listing natural language characters to training natural language characters.)

In some embodiments, in response to the decision statistic 307, the similarity classifier model(s) 211 is called in order to determine which item listings are similar to the clustered or classified item listing of the runtime input(s) 303, as described with respect to FIG. 2. For example, each item listing falling in the same cluster as the runtime input(s) 303 may be determined to be "similar" by the similarity classifier model(s) 211.

Figure 4:
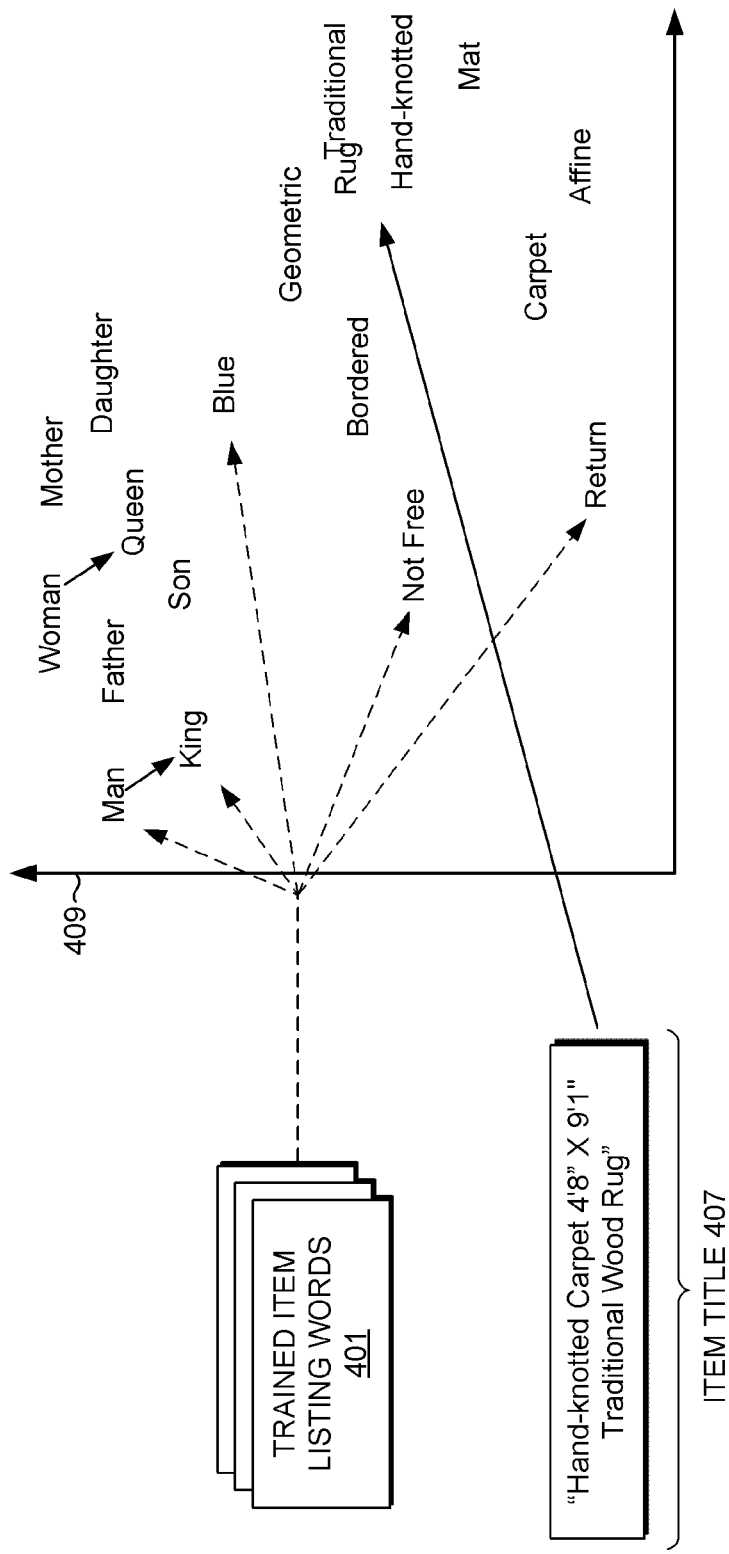
FIG. 4 is a schematic diagram illustrating how vectors associated with words are run through an NLP-based model that outputs a word embedding, according to some embodiments.

FIG. 4 is a schematic diagram illustrating how vectors associated with words are run through an NLP-based model that outputs a word embedding, according to some embodiments. In some embodiments, functionality described with respect to FIG. 4 represents or includes the functionality as described by the text similarity module 106-2 of FIG. 1. In some embodiments, the functionality described with respect to FIG. 4 represents or includes the functionality as described with respect to the item listing category determiner 104 of FIG. 1. In some embodiments, FIG. 4 represents functionality performed by the second machine learning model (associated with the feature space 208), as illustrated in FIG. 2.

The NLP-based model of FIG. 4 can be or represent any suitable model, such as WORD2VEC model, a Bidirectional Encoder Representations from Transformers (BERT) model, a Robustly-optimized BERT approach (RoBERTa) model, a DistiBERT model, and/or an XLNet model. A WORD2VEC model, for example, is a two-layer neural network model that runs one or more input vectors (e.g., characters of the item title 407) through a hidden layer (i.e., a column-row matrix) and a projection layer (e.g., a softmax classifier). WORD2VEC models predict target strings (e.g., "hand-knotted" in the feature space 409) from source context words (i.e., via the Continuous Bag of Words (CBOW) algorithm) or inversely predict source-context words from target words (i.e., via the skip-gram algorithm). In embodiments, when words are processed through a corresponding WORD2VEC or other word embedding model, the words are numerically represented in a word embedding that shows associated vectors and the distances from the string representations to each of those vectors, which is described in more detail below.

In order to embed or place points or vectors within the vector space 409, the model is trained using training data—i.e., the trained item listings and their associated words 401. In various embodiments, the training data includes a large corpus of unstructured data semi-structured, and/or structured data. The training data 401 is also an input of the NLP-based model. The training data includes some or each of the words as found within the feature space 409—man, king, delivery, etc.

In some embodiments, the feature space 409 represents a "pre-trained" embedding. A pre-trained embedding is a static model that is generated without feedback, retraining, or reference to the data sets being fed through it. For example, a user may download a static word embedding from an online source, which is already trained and includes the vectors or data points already mapped in vector space according to semantic similarity between words. In other embodiments, the vector space 409 represents a "retrained" or trained embedding. A retrained or trained word embedding receives training feedback after it has received initial training session(s) and is optimized or generated for a specific data set (e.g., for specific listings that include specific tracking tags or item information).

A "word embedding" as described herein represents vectors in vector space (e.g., also known as feature space or linear space) based on a contextual (e.g., semantic) similarity, feature similarity, and/or other similarity (e.g., amount of user interaction), such as between each vector or the natural language sequence (e.g., word) the vector represents. In some embodiments, two or more vectors that are semantically similar (e.g., have the same or similar meaning) may be mapped or embedded near each other in vector space regardless of the syntactic similarity (e.g., similarity between word structure or appearance). Through this semantic relationship functionality, computers can understand whether queries and search result candidates (e.g., item titles) are referring to the same item.

In order to map each of the word of the trained data 401 (or the item title 407) to its contextually appropriate point in the vector space 409, training algorithms are utilized. For example, in some embodiments, the NLP-based model is trained using the maximum likelihood (ML) principle to maximize probability of the next word $w_t$ (i.e., "target") given the previous words h (i.e., "history") in terms of a softmax function:

$$P(w_t \mid h) = \text{softmax}(\text{score}(w_t, h)) = \frac{\exp\{\text{score}(w_t, h)\}}{\sum_{\text{word } w' \text{ in Vocab}} \exp\{\text{score}(w', h)\}}$$

Where score ($w_t$, h) computes the compatibility of word $w_t$ with the context h. The model is trained by maximizing its log-likelihood on the training set that is maximizing $$J_{ML} = \log P(w_t \mid h)$$
$$= \text{score}(w_t, h) - \log\left(\sum_{\text{Word } w' \text{ in Vocab}} \exp\{\text{score}(w', h)\}\right)$$

This yields a properly normalized probabilistic model for language modeling. Each probability is computed and normalized using the score for all other words w' in the current context h at every training step. In some embodiments, some models, such as WORD2VEC, are trained using a binary classification objective, such as logistic regression, to discriminate the real target words $w_t$ from K noise words w", in the same context. Accordingly, instead of a softmax classifier, a noise classifier is used.

The output of the training algorithms and/or actual data input is each of the positional words in the vector space 409, which shows groupings of words that are similar (e.g., semantically similar). "Semantic similarity" is the semantic distance between two or more concepts (e.g., vectors representing tracking flag(s)/item data and vectors representing test case identifiers). The "distance" between any two or more words in some embodiments is based on the similarity of their meaning and/or semantic content, as opposed to any syntax similarity.

In some embodiments, the output as represented in the vector space 409 is computed based on a NLP-based model computing semantic similarity between words. For example, a vocabulary set (e.g., all the words in the vector space 409) may first be converted into input vectors via an input vector encoding (e.g., one hot encoding). For example, the word "bordered" may be converted into the vector [1,0,0,0,0]. This vector representation shows various dimensions, where each value corresponds to ordered words (e.g., each word in a set of trained test data candidates) and whether the word is TRUE or present. Because "bordered" is the only word being run through the NLP-based model in this example, the integer 1 is used to indicate its representation. "bordered" does not contain any of the other words within it (e.g., "blue" or "not free") so the other values are represented as 0. In some embodiments, based on generating the softmax function above or the output layer of the neural network, an output embedding vector representation can be generated, which is indicative of the actual coordinates that a vector will be embedded or placed in vector space 409 based on semantic similarity to other words and/or averaging or otherwise aggregating (e.g., via a dot product calculation) the output embedding vectors for all of the words within a particular item listing. In this way distance can be calculated between item listings themselves, as opposed to only the individual words that makeup the item listing. Using the illustration above, the "bordered" vector [1,0,0,0,0] can be converted to an output layer vector [1,2], which is the 2-dimensional plotting coordinates in vector space 409.

The distance between any two vectors or words is measured according to any suitable method. For example, in some embodiments, automated cosine similarity is used to compute distance. Cosine similarity is a measure of similarity between two non-zero vectors of an inner product space that measures the cosine of the angle between the two non-zero vectors. In these embodiments, no similarity is expressed as a 90 degree angle, while total similarity (i.e., the same word) of 1 is a 0 degree angle. For example, a 0.98 distance between two words reflects a very high semantic similarity while a 0.003 distance reflects little semantic similarity. As illustrated in the vector space 500-1, for example, the cosine similarity between "man" and "king" and "woman" and "king" are the same cosine distance, thus "king" in certain situations is semantically similar to "king" given the different input of "man" and "woman" are used. In some embodiments, the distance is represented as an average distance or the distance between a particular vector in vector space 509 and an average of other terms. In some embodiments, the distance is represented via fuzzy matching.

In some embodiments, FIG. 4 represents or includes a word-category co-occurrence matrix (e.g., a compilation of vector spaces). A matrix includes one or more vectors of a first vector space multiplied by one or more vectors of a second vector space (e.g., multiplying each word in the item title 407 to get a final distance). This allows rows within the vector space to be normalized for summing to 1 to become a probability distribution. Words or vectors can be compared using their category distribution. In some embodiments, each vector representing a word in an item listing is combined or aggregated (e.g., via a dot product operation) with another word in the same (or different) item listing in order to get an aggregated score or distance between any words and/or item listings that that words are a part of.

After the training data 401 is run through the training algorithm, the output is represented in the feature space 409. In some embodiments, in response to generating the training data 401 in the vector space 409, the item title 407 "hand-knotted carpet 4'8"×9'1" traditional Wool Rug" is received (e.g., at runtime). This corresponds to a description of an item in an item listing's title. In response to receiving the item title 407, particular embodiments map each word in the item title 407 according to its semantic similarity to other words within the vector space 409 (i.e., all of the trained item listing words 401). For example, the item title 4 407 term "hand-knotted" can be mapped to its place in feature space 409. As described herein, some embodiments aggregate or combine such mapping (e.g., via a dot product function) with other mappings of the item title 407 in order to determine the overall or aggregated distance between the item title 407 and individual item listings in the trained data 401. For example, FIG. 4 illustrates that that the terms in the item title 407 is closest, in distance, to the terms "geometric" and "bordered," which can be aggregated and mapped to the item listing "Hand-knotted Carpet 5'0"×6'6" bordered, geometric, traditional wool rug" Accordingly, "Hand-knotted Carpet 5'0"×6'6" bordered, geometric, traditional wool rug" may be what is predicted to be "similar" to the item title 407.

Figure 5:
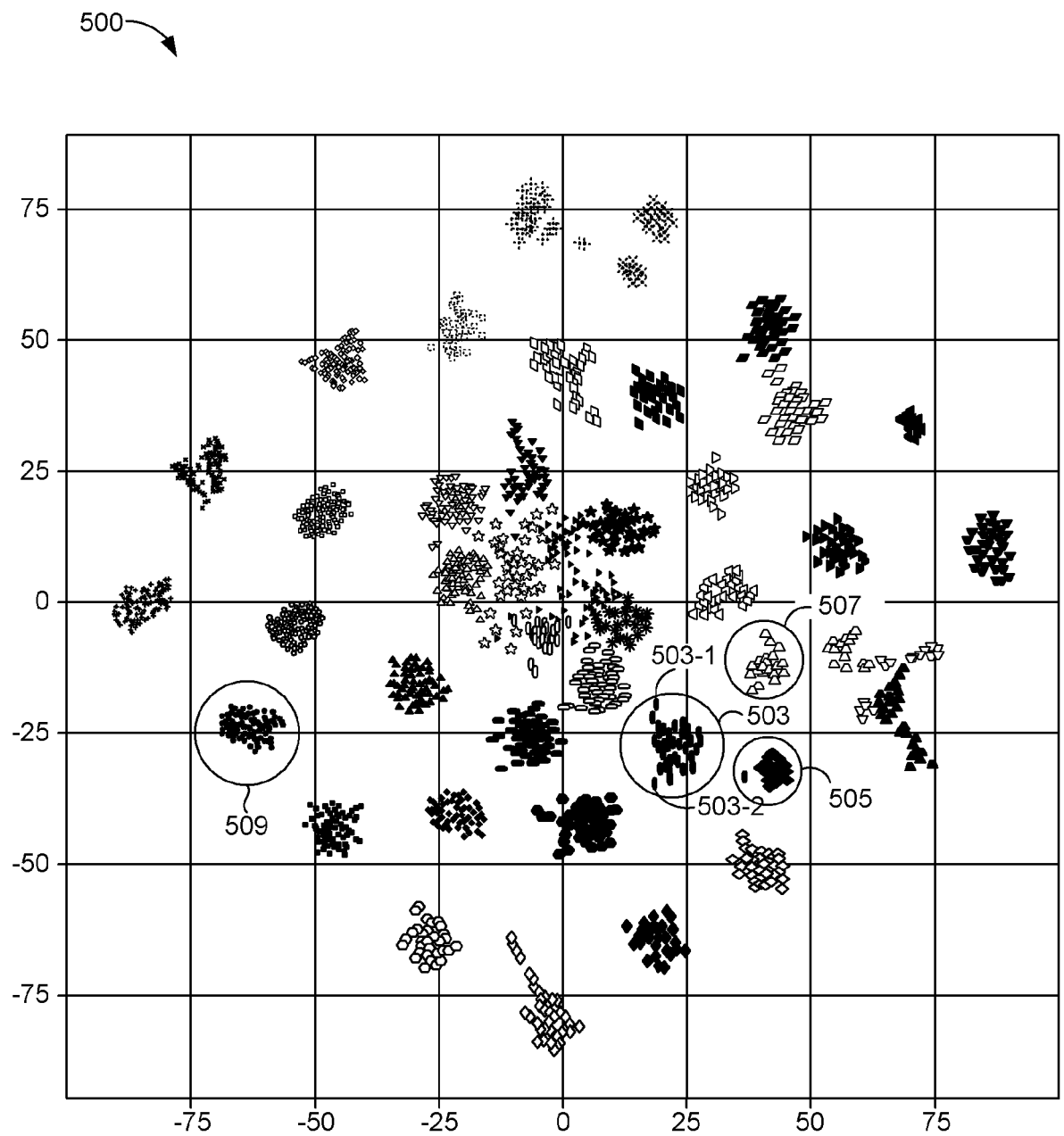
FIG. 5 is a schematic diagram of an example visualization of vector space that illustrates various clusters or classes of feature vectors, according to some embodiments.

FIG. 5 is a schematic diagram of an example visualization of vector space 500 that illustrates various clusters or classes of feature vectors, according to some embodiments. In some embodiments, the feature space 500 represents the functionality produced (or used) by the image similarity module 106-1 of FIG. 1. In some embodiments, the vector space 500 represents the vector space 206 of FIG. 2.

In some embodiments, the vector space 500 includes clusters of data points (e.g., data point 503-1 and data point 503-2) representing individual feature vectors corresponding to specific trained item listings. These data points are formed together to form a particular class (or cluster). For example, the data point 503-1 and data point 503-2 may have been classified as "HONDA 15 horse power boat motor" 503 (indicative that the feature values of the data points 503 are within a threshold distance to or similar to other trained data points or that they refer to the exact same item). There are other classes, such as class 505 (e.g., "HONDA 40 horse power boat motor") and the class 507 (e.g., "HONDA model Y car engine.").

In an illustrative example of how the feature space 600 is used, embodiments may receive an image within an item listing to cluster the image according to its pixel features. Responsively, some embodiments run the image through one or more machine learning models in order to weight features for the image, after which a feature vector (e.g., representing the data point 503-1) is embedded in the feature space 500. The feature space 500 in various embodiments represents a multidimensional coordinate system where each feature is associated with one or more dimensions. For example, a first set of values in a vector may represent eye features of a person, where a first axis represents the first set of values and a second axis represents a second set of values representing a nose belonging to the person of the same vector. Each feature value within the feature vector may be summed or otherwise aggregated to arrive at a final coordinate point (e.g., the data point 503-2) within the feature space 500. Each of the data points within the class 503, for example, are within a feature similarity threshold and so they are close to each other (e.g., based on Euclidian distance) in the feature space 500. Responsive to the embedding of the feature vector in the feature space 500, embodiments classify or cluster the vectors. For example, if a first vector represents data point 503-1, then the classification that is nearest to the data point 503-1 is the "HONDA 15 horse power motor" Classification 503 indicative of the image referring to this accessory item.

The machine learning model(s) are able to cluster samples of new unseen queries (e.g., any query received after training). In some embodiments, query and/or search result candidate is represented by the median of its samples' embeddings as shown below:

$$C = \text{median}\{f_{embed}(S_i^j): I=1,2,\ldots,n\]$$

Where $f_{embed}$ is the output of the model, $S_i^j$ is the $i^{th}$ sample of the $j^{th}$ class. The prediction for any test sample X is given by:

$$Pred(X) = \operatorname*{argmin}_{j} \|C_{j-} f_{embed}(X)\|.$$

However, it is understood that median is just one way to represent an embedding. Some embodiments alternatively use other statistics like mean, pth percentile, and the like.

Figure 6:
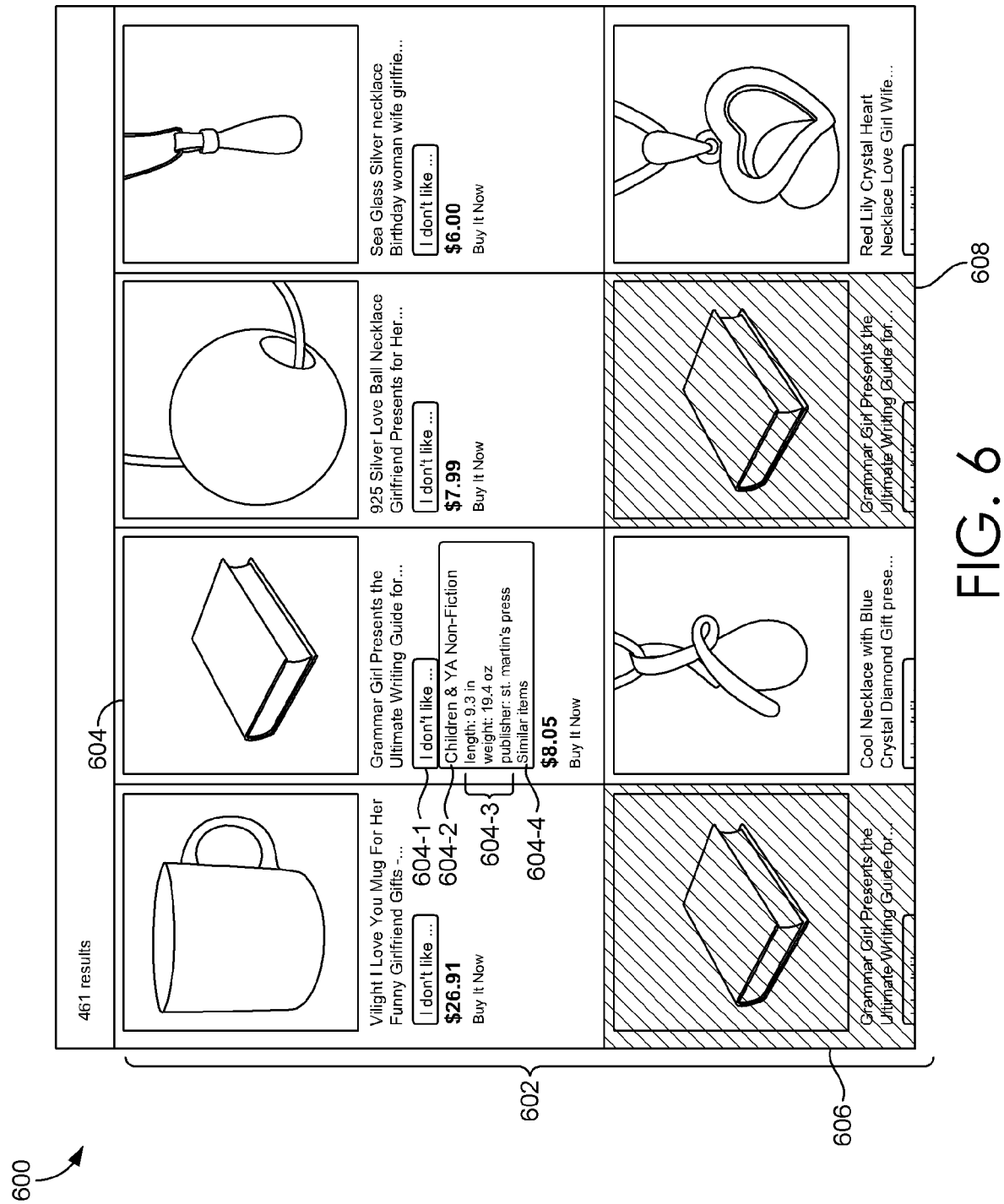
FIG. 6 is an example screenshot of a user interface, according to some embodiments.

FIG. 6 is an example screenshot 600 of a user interface, according to some embodiments. In some embodiments, the screenshot 600 represents what is caused to be presented by the presentation component 112 of FIG. 1. The item listings 602 (including the item listing 604) are caused to be presented in response to executing a query. Each of the item listings include an "I don't like" button, such as the button 604-1 in the item listing 604. In some embodiments, the removal indicator 112-1 represents the "I don't like" button 604-1. When the user selects on the "I don't like" button 604, embodiments causes a drop down list of attribute indicators to be presented—i.e., 604-2, 604-3, and 604-4. In some embodiments, when the button 604-1 has been selected, the item listing 604 will be marked as currently selected so that this item listing, as well as all other item listings in the search results that are associated with particular selected attributes (e.g., indicated by the indicators 604-2, 604-3, and 604-4) can be removed, as described herein. Alternatively, in some embodiments, the selected item listing will affirmatively not be removed (e.g., item listing 604 will not be removed), and only those other item listings in the search results that are associated with particular selected attributes can be removed The indicator 604-2 represents an item listing category that the item listing 604 belongs to—i.e., "Children $ YA Non-Fiction". In some embodiments, the category value indicator 112-3 of FIG. 1 is represented by the indicator 604-2. In some embodiments, such item listing category is the item listing category determined by the item listing category determiner 104, as described with respect to FIG. 1. In response to a user selection of the indicator 604-2, various embodiments (e.g., the category locator 114-2) receive an indication that the user has selected this indicator 604-2 and responsively cause removal of all item listings, as search results, that belong to the same item listing category. In some embodiments, in response to the receiving of this indication, the category locator 114-2 performs its functionality and corresponding item listings are removed.

The indicator 604-3 represents various selectable aspect values of the item listing 604—i.e., "length: 9.3 in," "weight: 19.4 in.," and "publisher: st. martin's press." In some embodiments, the aspect value indicator 112-2 of FIG. 1 is represented by the indicator 604-3. The indicator 604-3 represents each aspect (i.e., length, weight, and publisher) and its corresponding aspect values (i.e., 9.3, 19.4, and st. martin's press). In some embodiments, such aspects and aspect values are those selected or determined for user selection, as described with respect to the item listing aspect value determiner 102 of FIG. 1. In response to a user selection of one of the indicators 604-3, various embodiments (e.g., the aspect value locator 114-1) receive an indication that the user has selected this indicator 604-3 and responsively cause removal of all item listings, as search results, that belong to the same aspect value. In some embodiments, in response to the receiving of this indication, the aspect value locator 114-1 performs its functionality and corresponding item listings are removed. In an illustrative example, in response to receiving an indication that the user has selected the "publisher: st. martin's press" aspect value indicator, various embodiments identify all other item listings sharing that aspect and remove the item listings from the search results 602.

The indicator 604-4 represents a selectable button in order to locate and remove item listings that are similar to the item listing 604. In some embodiments, the similarity indicator 112-4 of FIG. 1 is represented by the indicator 604-4. In some embodiments, such similarity determination is made by the item listing similarity determiner 106, as described with respect to FIG. 1. In response to a user selection of the indicator 604-4, various embodiments (e.g., the similarity locator 114-3) receive an indication that the user has selected this indicator 604-4 and responsively cause removal of all item listings, as search results, that are similar to the item listing 604 (e.g., the currently selected item listing, since the user has selected the button 604-1). In some embodiments, in response to the receiving of this indication, the similarity locator 114-3 performs its functionality and corresponding item listings are removed.

In response to receiving an indication that the user has moved or hovered a mouse pointer over one of the indicators 604-2, 604-3, and 604-4 (which may be considered as a type of selection), some embodiments "mark," in the screenshot 600, the associated item listings as candidates for removal. In this way the user can view which item listings will be removed from the search results, while still being able to view the item listing (because of the opaque marking) and still being able to change his mind if he or she does not want an item listing removed. The screenshot 600, for example, indicates the marked item listing search results 606 and 608 are presented in the form of masked or shaded item listings in an opaque or other indicator to indicate that it is a candidate for removal. In some embodiments, the masking indicator 112-5 of FIG. 1 is represented by the mask or shaded regions in the search results 606 and 608. In some embodiments, the masking component 114-4 of FIG. 1 causes such masking, as illustrated in the search results 606 and 608. In some embodiments, in response to receiving an indication that a user has directly clicked on or selected (not just hovered) one of the indicators 604, various embodiments actually cause removal of one or more of the masked search results 606 or 608 such that they are no longer visible in a search results page.

Figure 7:
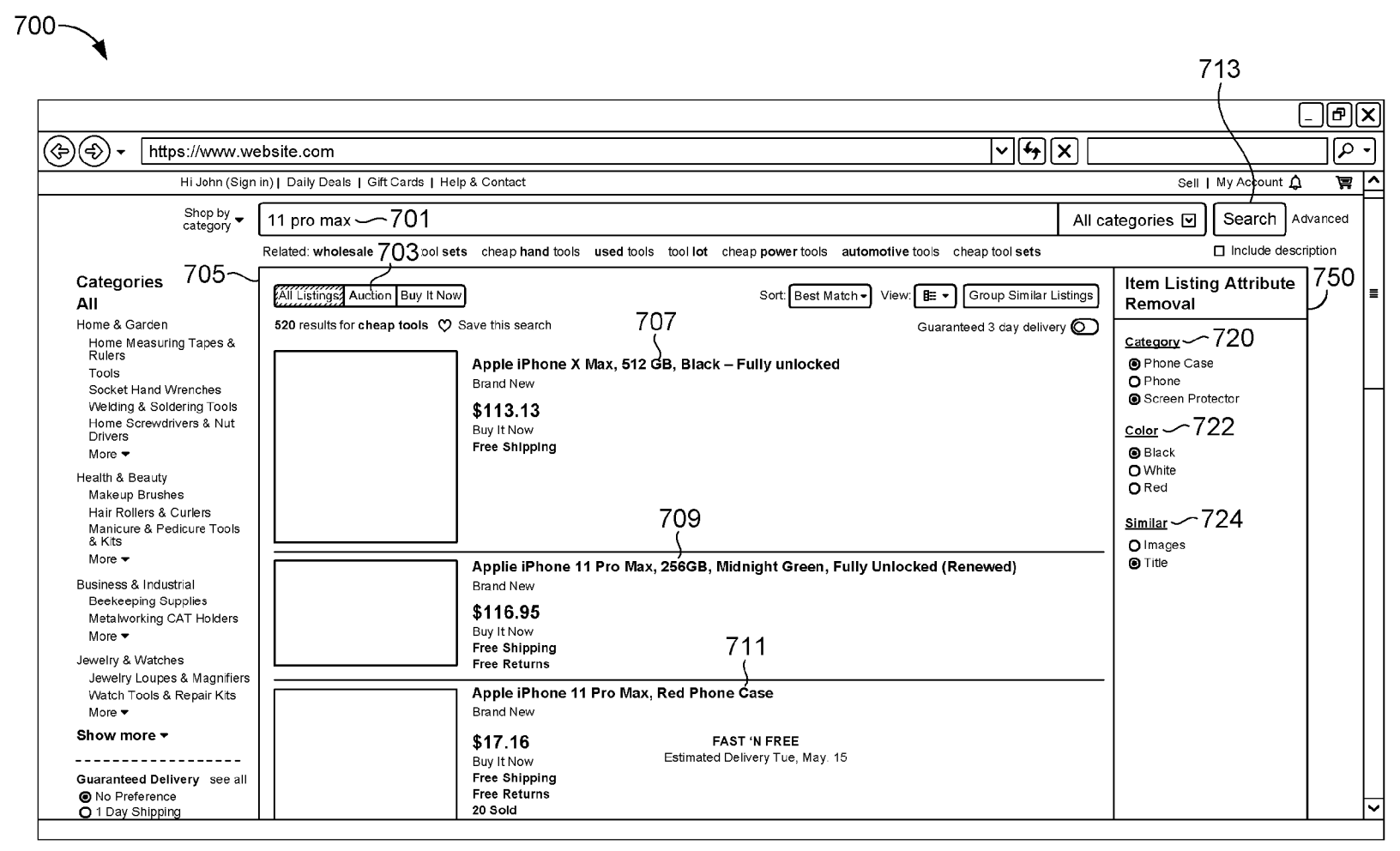

FIG. 7 is a screenshot 700 of an example user interface and search result page 705, according to some embodiments. The screenshot 700 illustrates that a user has issued the query "11 Pro Max" within a search field 701. In response of a user selection of the search button 713, the search result page can be displayed that includes the item listings 707, 709, and 711, which are each oriented based on their rank. In some embodiments, the search result identifiers 907, 909, and 911 are displayed. In some embodiments, the item listings 707, 709, and 711 are caused to be rendered to the search results page 905 by the query processor 108 of FIG. 1.

The attribute removal pane 750 allows the user to specify criteria or attributes she does not like so that corresponding item listings can be removed. In some embodiments, the specific attribute values (e.g., "phone case," "black", etc.) are rendered to the screenshot 700 or generated in response to processing the query and/or rendering the item listings to the search result page 705. In this way, the attribute removal pane 750 includes different attribute values for each query by including values corresponding to values indicated in the specific query. For example, if the query indicated in the field 705 referred to a toy truck, the category indicator 720 may include attribute values of "brand" or "remote control" or "push car," for example. Alternatively or additionally, these specific attribute values are rendered as part of the query processor 108 executing the query. In these embodiments, for example, the query processor 108 can call the item listing aspect value determiner 102, the item listing category determiner 104, and/or the item listing similarity determiner 106 (and/or access the storage 125) to determine the attribute values to render for the category identifier 720, the color identifier 722, and the similar identifier 724. Alternatively or additionally, the attribute removal pane 750 is predetermined before the query is processed and is the same for each query.

In some embodiments, the category identifier 720 and all of the corresponding category values are determined by the item listing category determiner 104, as described with respect to FIG. 4. In some embodiments, the category identifier 720 and all of the corresponding category values represent the category indicator 112-3 of FIG. 1. Likewise, in some embodiments, the color identifier 722 and all of the corresponding category values are determined by the item listing aspect value determiner 102, as described with respect to FIG. 1. In some embodiments, the color identifier 722 and all of the corresponding color values represent the aspect value indicator 112-2 of FIG. 1. Likewise, in some embodiments, the similarity identifier 724 and all of the corresponding similarity values are determined by the item listing similarity determiner 106 of FIG. 7. In some embodiments, the similarity identifier 724 and all of the corresponding similarity values represent the similarity indicator 112-4 of FIG. 1.

As illustrated in FIG. 7, the user has selected (e.g., subsequent to the item listings 707, 709, and 711 being rendered to the search results page 705) the "phone case"

and "screen protector" attribute values of the category identifier 720. Likewise, the user has selected the "black" attribute value of the color identifier 722. Likewise, the user has selected the "title" attribute values of the similarity identifier 724. Responsive to receiving an indication of these selections, various embodiments cause a marking and/or removal (e.g., via the item listing remover 114) of each item listing from the search result page 705 (and/or other search result pages) that refer to a phone case (e.g., via the category locator 114-2), a screen protector (e.g., via the category locator 114-2), phones that are black in color (e.g., via the aspect value locator 114-1), and titles that are similar to, for example, selected item listing 707 (e.g., via the similarity locator 114-1).

Figure 8:
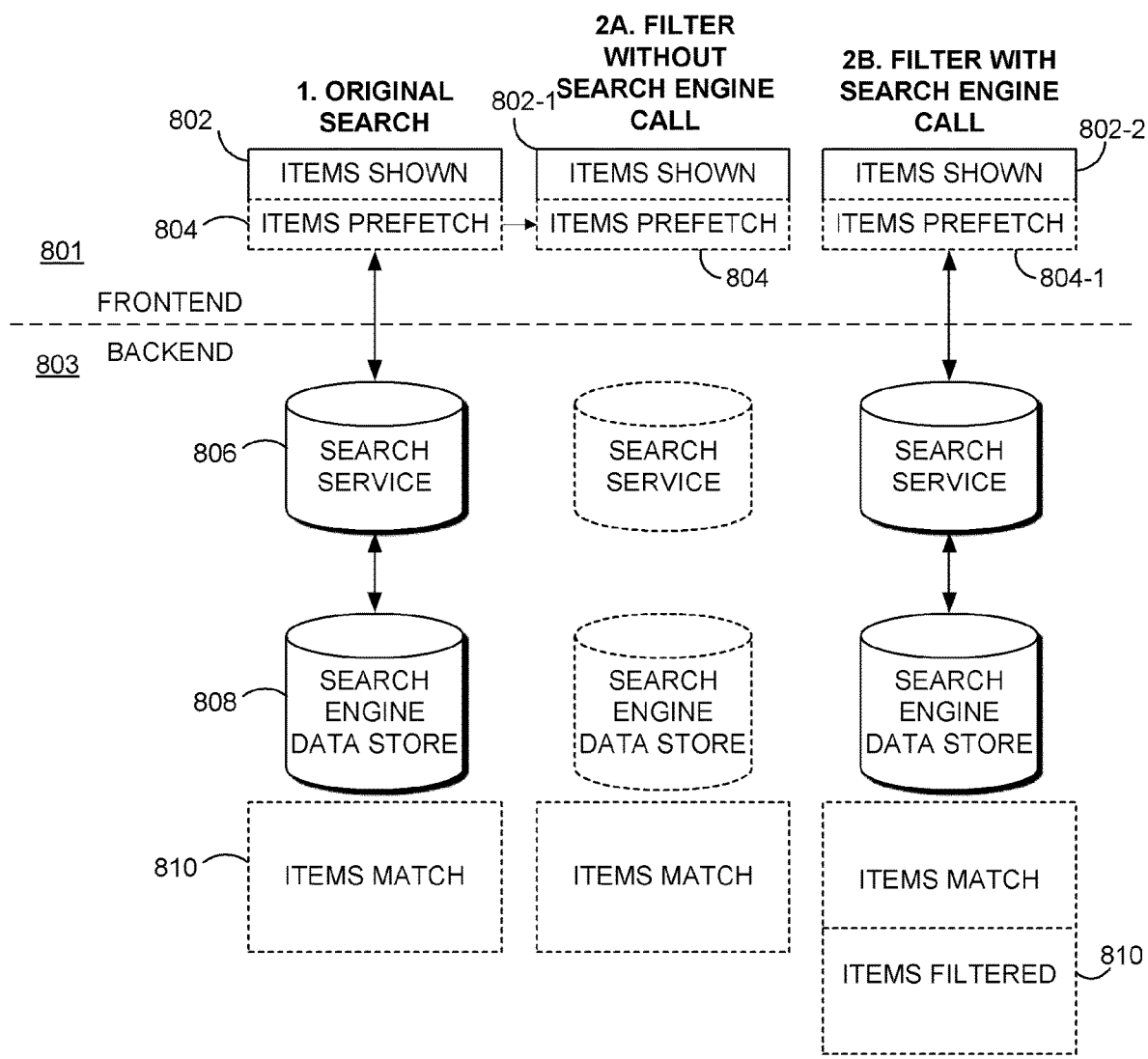
FIG. 8 is a block diagram of an example system for locating additional search results for situations when item listings are removed, according to some embodiments

FIG. 8 is a block diagram of an example system 200 for locating additional search results for situations when item listings are removed, according to some embodiments. In some embodiments, the system 200 represents the functionality of the prefetching component 108-2, as described above with respect to FIG. 1.

FIG. 8 illustrates three scenarios of a "1. original search", "2a filter without a search engine call," which corresponds to removing item listings without calling the search service 806 to add additional item listings, and "2b filter with search engine call," which corresponds to removing item listings and calling the search service 806 to add additional item listings. For step 1, an original search is performed. For example, referring back to FIG. 7, the query input into the field 701 is issued and executed such that the item listings 802 (e.g., item listings 707, 709, and 711) are rendered to a user device. As a part of or subsequent to executing the query to render the item listings 802, additional item listings are pre-fetched (e.g., via the pre-fetch component 108-2 of FIG. 1) at the frontend 801 by programmatically calling the search service 806 (e.g., an electronic marketplace server or URL) at the backend 803. The search service executes the query by looking in the search engine data store 808 to see if any item listing match the query. Based on the matching item listings 810, the search service 806 returns the matched item listings to the frontend 801 so that a first set of search results that match the query are rendered as item listings 802 that are provided to a user interface. In other words, these item listings can be rendered to the search result page 705 and/or additional pages that can be viewed by the user. Additionally, a second set of search results that match the query are marked as pre-fetched items 804.

In some embodiments, the additional item listings marked as pre-fetched items 804 are not rendered or displayed to the search result page 705 and/or additional pages if and until an indication is received that a user has made a selection to remove item listings in the shown item listings 802 (e.g., via the item listing remover 112), as described in more detail below. Alternatively, in some embodiments, the additional item listings marked by items pre-fetch 803 and that match the query are rendered, along with the item listings that match the query, to the same search results page 705 and/or additional search results pages.

In some embodiments, subsequent to the item listings being rendered as search results 802 at step 1, step 2a occurs. That is, the user may make a selection for which item listings she wants to remove. For example, referring back to FIG. 6, the user may select the "I don't like" button 604-1 and that publisher aspect value of "st. martin's press" under the aspect values 604-3. Responsive to receiving an indication that the user has selected this aspect value, various embodiments remove each of the item listings contained in the item listings shown 802 that contain this same aspect value. Responsive to this removal, various embodiments render or cause display of the pre-fetched additional item listings (e.g., that do not have the selected aspect value) obtained via the items pre-fetch 804, which was performed at the step 1 of the original search. Accordingly, the search result page (or search result pages) is updated to illustrate new item listings shown 802-1. In this way, the browser or other client application does not have to make an extra call to the search service 806 in order to fetch additional item listings, thereby saving on packet generation, network latency, and throughput costs. This is because this because the item listings at 804 were already pre-fetched by calling the search service 806 at original search step 1.

In some embodiments, subsequent to the item listings being rendered as search results at step 1, step 2b occurs (alternative to step 2a). That is, the user may make a selection for which item listings she wants to remove. For example, referring back to FIG. 6, the user may select the "I don't like" button 604-1 and that publisher aspect value of "st. martin's press" under the aspect values 604-3. Responsive to receiving an indication that the user has selected this aspect value, various embodiments remove each of the item listings contained in the item listings shown 802 that contain this same aspect value. Responsive to this removal, various embodiments render or cause display of additional item listings 812 (e.g., that do not have the selected aspect value) obtained via the items pre-fetch 804-1. Accordingly, the search result page (or search result pages) are updated to illustrate new item listings shown 802-2. In this way, the browser or other client application makes an extra or second call to the search service 806 in order to fetch additional item listings 812 not just based on the query of original search in step 1 (which finds the matched item listings 810), but based on the additional selections to remove item listings based on particular attributes (i.e., exclusion criteria). In other words, the search service 806 finds item listings in the search engine data store that match the exclusion criteria indicated by the user so that additional relevant item listings are rendered. This may occur in situations where item listings are removed over some quantity threshold such that additional item listings left over in the item listings shown 802 and the items pre-fetch 804 are still not enough to populate a search results page or pages. This may also occur alternative to step 2a in response to any indication received for a removal of item listings.

Figure 9:
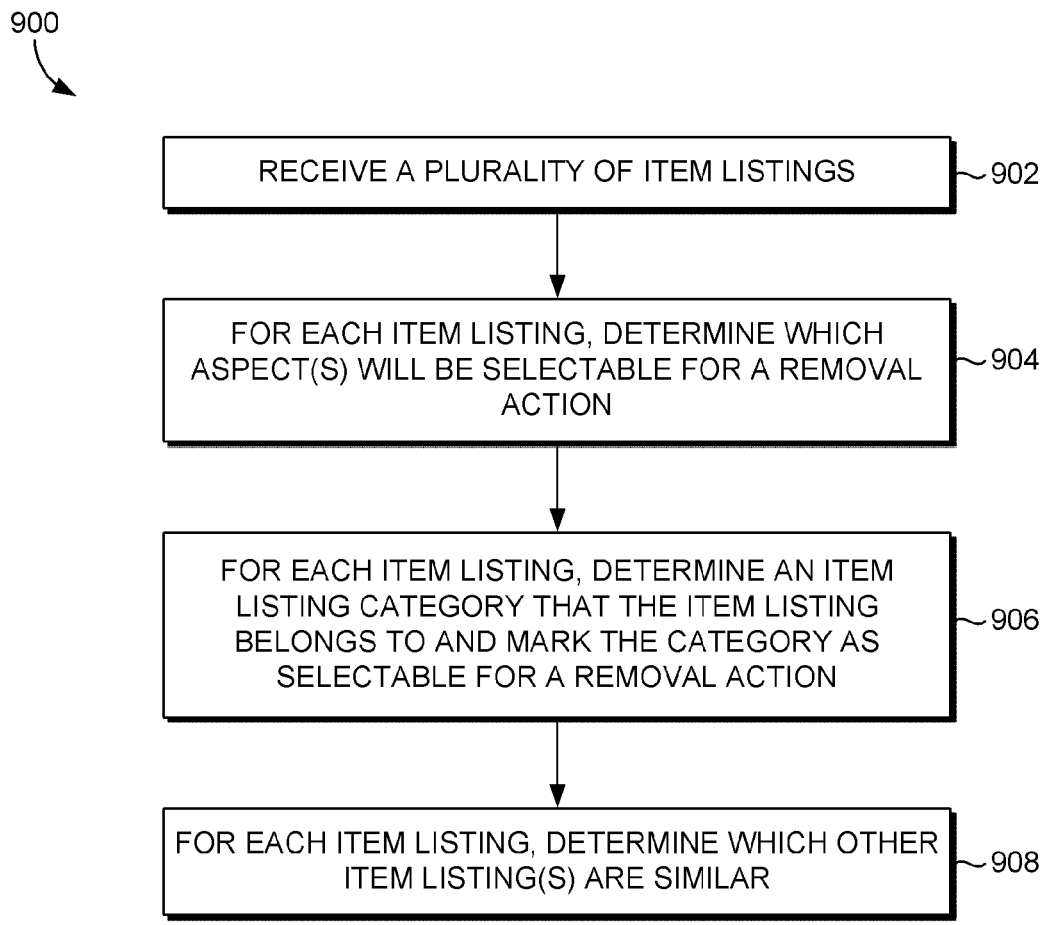
FIG. 9 is a flow diagram of an example process for determining and marking various attribute values associated with a plurality of item listings, according to some embodiments.

FIG. 9 is a flow diagram of an example process for determining and marking various attribute values associated with a plurality of item listings, according to some embodiments. In some embodiments, the process 900 represents offline or non-runtime processes that occur before a particular user query is received to render item listings. The process 900 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (e.g., as described with respect to FIG. 1 through FIG. 8). The computer-implemented method, the system (that includes at least one computing device having at least one processor and at least one computer readable storage medium), and/or the computer readable medium as described herein may perform or be caused to perform the process 900 or any other functionality described herein.

Per block 902, a plurality of item listings are received. For example, an electronic marketplace server can receive a batch of item listings that sellers have created to sell corresponding items in the electronic marketplace. Per block 904, for each item listing (of the plurality of item listings), particular embodiments (e.g., the item listing aspect value determiner 102 of FIG. 1) determine which aspect(s) will be selectable (by a user) for a removal action at runtime and mark the aspect(s) as selectable. Some embodiments determine which aspect value, of the first item, meets a threshold (e.g., entropy threshold or Jaccard index threshold) for describing the first item and marking the corresponding aspect as selectable to later remove the associated item listings based on the determining. Examples of this are described with respect to the item listing aspect value determiner 102. In an illustrative example, referring back to FIG. 6, the aspects of length, width, and publisher aspects (and their corresponding values) are marked as selectable (whereas "color," "price," or "brand" aspects are not selectable, for example) based on entropy-based calculations, Jaccard index, or any other suitable algorithm, as described with respect to the item listing aspect value determiner 102.

Per block 906, for each item listing, particular embodiments (e.g., the item listing category determiner 104 of FIG. 1) determine an item listing category that the item listing belongs to and mark the category (or category identifier) as selectable for a removal action. Examples of this are described with respect to the item listing category determiner 104 of FIG. 1. In an illustrative example, referring back to FIG. 6, the category 604-2 is made selectable for users (whereas "books" are not selectable, for example) based on any algorithm as described with respect to the item listing category determiner 104.

Per block 909, for each item listing particular embodiments (e.g., the item listing similarity determiner 106 of FIG. 1) determine which other item listing(s) are similar to the item listing. Examples of this are described with respect to the item listing similarity determiner 106 of FIG. 1, FIG. 2, FIG. 3, FIG. 4, and FIG. 5. Employing these algorithms allow, for example, additional item listings to be removed, via a selection of the button 604-4 of FIG. 6, that are similar to a currently selected item listing.

In various embodiments, a new record, entry or other structured data object is generated based on the blocks 904, 906, and/or 908. For example, embodiment can store, to the storage 125, an item listing with tags, metadata, and/or an index to indicate the particular selectable aspect value(s), selectable category, and/or other similar item listings. In this way, when the query processor 108 retrieves item listing search results to execute a query, the item listings will already be tagged or otherwise be structured when the presentation component 112 presents the item listings as illustrated, for example, at the search results 602 of FIG. 6.

Figure 10:
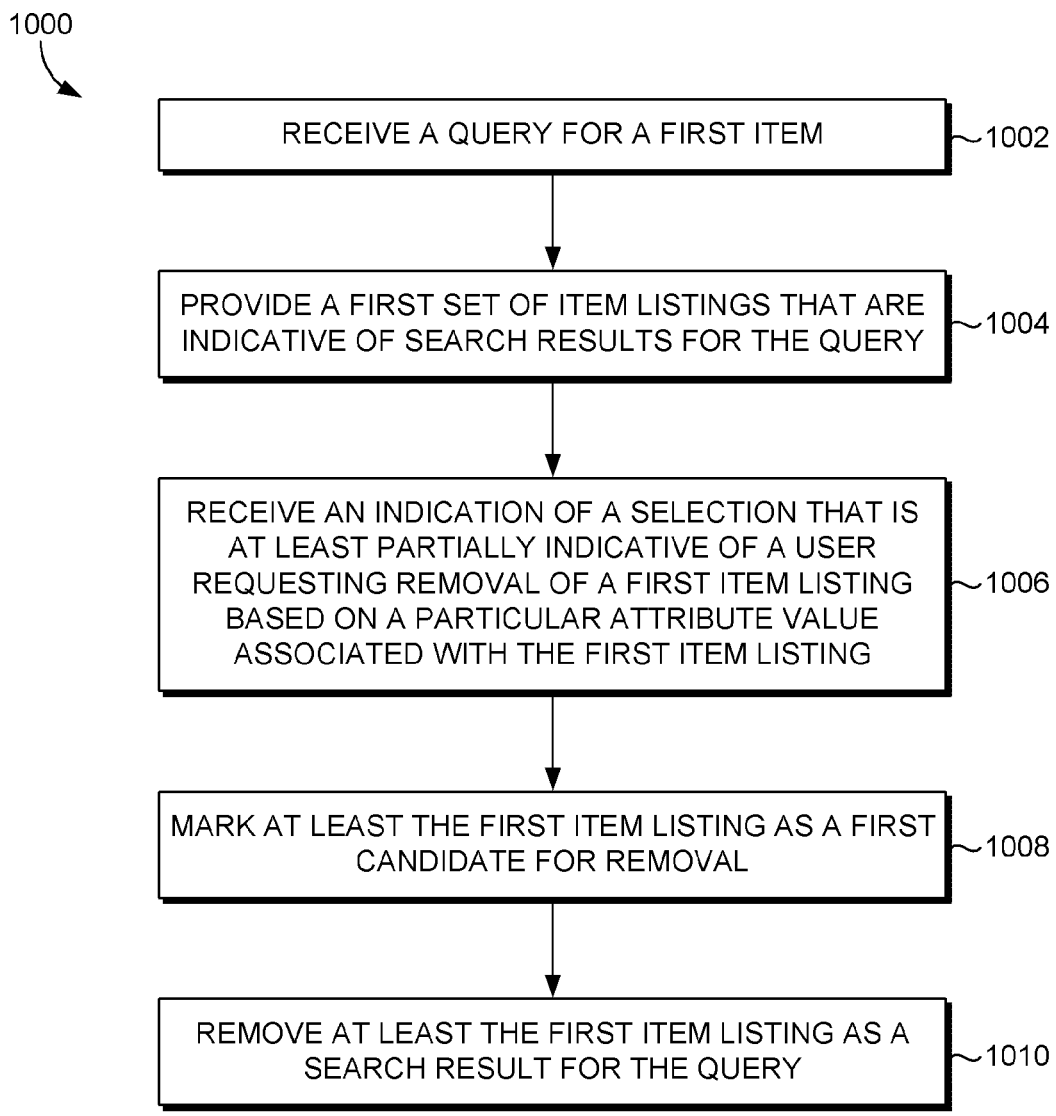
FIG. 10 is a flow diagram of an example process for causing a removal of one or more item listings as search results for a query, according to some embodiments.

FIG. 10 is a flow diagram of an example process 1000 for causing a removal of one or more item listings as search results for a query, according to some embodiments. In some embodiments, the process 1000 represents runtime functionality that occurs subsequent to the process 900, which may represent offline functionality. In some embodiments, the process 900 is used to perform the process 1000, as described in more detail below.

Per bloc 1002, a query for a first item listing is received. For example, the query processor 108 receives a query. In some embodiments, the first item listing indicates a first item that is for sale in an electronic marketplace. In some embodiments, the query is issued at a computing device (e.g., a mobile phone, a tablet, a smart watch) associated with a user. In an illustrative example, referring back to FIG. 7, a user at a computing device may populate the query within the field 901 and embodiments can receive the query in response to a selection of the button 713.

Per block 1004, particular embodiments provide a first set of item listings that are indicative of search results for the query. For example, referring back to FIG. 6, the search results 602 may be provided, or the search results 707, 709, and 711 may be provided to the search result page 705 of FIG. 7 in response to executing the corresponding query. In some embodiments, the first set of item listings are provided to the computing device of the user. Some embodiments, additionally provide, to the computing device, a user interface element (e.g., associated with a first item listing of the first set of item listings). For example, the user interface element may be one or more of the buttons or identifiers 604-1, 604-2, 604-3, and/or 604-4 of FIG. 6. Alternatively, the user interface element may be the category identifier 720 and/or respective category values, the color identifier 722 and/or the corresponding color values, and/or the similar identifier 724 (and/or the corresponding similarity values).

Some embodiments dynamically execute the query by providing the user interface element and/or a set of attributes associated with the first set of item listings in addition to causing display of search results. This is described with respect to FIG. 6 and FIG. 7. For example, referring back to FIG. 7, in response to the query "11 pro max" being submitted, the screenshot may display the "phone case," and "screen protector" fields (the user interface element), as well as corresponding attributes (e.g., "category," "color" and "similar" within the window pane 750) and the search results (e.g., search result 707). This is contrasted with existing technologies that generate predetermined user interfaces that show the same data for every query. A "user interface element" as described herein refers to any suitable user interface feature, such as a button, field, dial, window, drop-down arrow, or any other user interface feature as described with respect to the presentation component 112 of FIG. 1.

Per block 1006, various embodiments receive an indication of a selection that is at least partially indicative of a user requesting removal of a first item listing based on a particular attribute value associated with the first item listing. In some embodiments, such selection is of the user interface element describe above with respect to block 1004. In some embodiments, the receiving of the indication occurs subsequent to the providing of the first set of item listing at block 1004. An "indication" as described herein refers to a flag, message, notification, voltage level, signal or other indicator. For example, an electronic marketplace server can receive a notification from a user device that a user has selected the UI element. In another example, a processor, stored locally to a user device, can receive an electrical signal that the user has selected the UI element.

A "selection" as described herein can refer to an actual mouse click, gesture, voice utterance or other motion to affirmatively and directly request removal. In some embodiments, a selection includes indirect activity, such as hovering or moving a mouse pointer over a UI element (and not affirmatively clicking on the UI element).

In some embodiments the selection is further indicative of the user requesting removal, from the search results, of each item listing that has a particular item attribute value (e.g., a request remove each item listing rendered to the displayed search result page 705 (and additional non-displayed search results pages) that has a "black" aspect value for the item) In some of these embodiments, the selection is indicative of the user requesting removal of a first item listing and each item listing that has a particular value that the first item listing has (e.g., removal of item listing 605 (the first item listing) and the item listing 608). Alternatively, the selection in some embodiments is indicative of the user requesting removal, from the search results, of only a first item listing based on a particular value associated only with that first item listing (e.g., requesting removal of only the first item listing 707 based on an undesirable aspect value).

In some embodiments, the "attribute value" referred to at block 1006 corresponds to a particular item category value such that the selection is indicative of a request to remove one or more item listings that belong to the particular item category. For example, referring back to FIG. 6, the selection may be of the identifier 604-2, which is indicative of a request to remove one or more item listings that belong to the category value of "Children & YA non-fiction" books.

In some embodiments, the "attribute value" referred to at block 1006 includes one or more aspect values (e.g., a particular brand of an item or particular color of an item) such that the selection is indicative of a request to remove one or more item listings that indicates the particular aspect value. For example, referring back to FIG. 6, the selection of one of the aspect values included in 604-3 may be indicative of a request to remove one or more item listings that share the particular 9.3 length values, 19.4 oz. values, and/or the "st. martin's press" values of the item listing 904.

In some embodiments, the "attribute value" referred to at block 1006 corresponds to one or more item listings that are similar to the first item listings such that the selection is indicative of a request to remove one or more item listings that are similar to a currently selected item listing. For example, referring back to FIG. 6, the selection may be of the identifier 604-4, which is indicative of a request to remove one or more item listings that are similar to the item listing 604.

In some embodiments, the selection at block 1006 is further indicative of a request to remove a currently selected item listing, where the currently selected item listing is different than the first item listing, and where the first item listing is not currently selected. For example, referring back to FIG. 6, a user may have selected the "I don't like" button 604-1 (e.g., indicating that the user does not like the item listing 604), which may represent the "currently selected" item listing based on the selection of the button 604-1. Subsequently, the user may have selected one of the aspect values, such as the weigh value, indicated in 604-3. Responsively, some embodiments remove additional item listings that includes the "first item listing," as well as the currently selected item listing.

Alternatively or additionally, in some embodiments, the selection at block 1006 is further indicative of a request to remove a currently selected item listing, where the currently selected item listing is the same as the first item listing. For example, referring back to FIG. 6, a user may have selected the "I don't like" button 604-1 (e.g., indicating that the user does not like the item listing 604), which may represent the "currently selected" item listing and the "first item listing" based on the selection of the button 604-1. Subsequently, the user may have selected one of the aspect values, such as the weigh value, indicated in 604-3. Responsively, some embodiments remove item listing 604.

In some embodiments, each of the first set of item listings include a user interface element that is selectable to cause removal of a selected item listing and all other item listings, from the search results, that share the particular attribute value. For example, referring back to FIG. 6, each of the item listings in the search results 602 include an "I don't like" button (e.g., button 604-1). Based on the particular selection of the button 604-1, for example, the item listing 604 and all other item listings may be caused to be removed, which share a "weight 9.3 in" aspect value.

Per block 1008, various embodiments mark at least the first item listing as a first candidate for removal as a search result for the query. In some embodiments, block 1008 occurs automatically and at least partially response to the receiving of the indication at block 1006. In some embodiments, such marking includes (or is preceded by (generating a mask to be displayed over each image and/or text of each item listing that is a candidate for removal (e.g., that includes a similar image and/or text). For example, referring back to FIG. 6, in response to receiving an indication that the user has selected the "st. martin's press" aspect value of the indicator 604-3, various embodiments generate a mask over the item listing 606, as illustrated in FIG. 6. In some embodiments, "marking" an item listing for removal need not be presented (e.g., to a user interface). For example, the marking may be indicative of a Boolean value, flag, or other indicator that a process uses to indicate that a particular item listing (or set of item listings) is to be removed without indicating this in a UI.

In some embodiments, such marking may refer to or include an "indicator" that is displayed to a computing device, where the indicator denotes that at least the first item listing is a candidate for removal. In some embodiments, such indicator is a "mark" referred to herein, such as a mask. In some embodiments, the indicator can alternatively or additionally include natural language indicia, such as "candidate for removal" or "this item listing will be removed." Alternatively or additionally, the indicator can be a colored symbol, such as a red circle indicating that an item listing will be removed.

In some embodiments, the marking at block 1008 includes marking a second item listing, of the first set of item listings, as another candidate form removal as a search result for the query. For example, not only may item listing 606 be marked as a candidate for removal, but item listing 608 based on the selection of the "st. martin's press" aspect value of the aspect value indicator 604-3, since at least both of the item listing 606 and 608 may share the particular aspect value.

Per block 1010, various embodiments (e.g., a user device and/or an electronic marketplace server) cause removal of at least the first item listing (e.g., and a second item listing) as a search result for the query received at block 1002. In some embodiments, such removal occurs automatically and at least partially in response to the receiving of the indication at block 1006 (or based at least in part on the selection of the user interface element). For example, referring back to FIG. 6, in response to receiving an indication that the user has selected the "st. martin's press" aspect value, various embodiments automatically remove item listing 606 (e.g., without marking and displaying the masked item listing 606 and/or the item listing 608). Alternatively, in some embodiments, however, such removal further occurs in response to receiving an additional indication of a selection of a user. For example, some embodiments may not remove item listing 606 if and until an indication has been received that the user has selected item listing 606.

As described herein to "remove" an item listing can refer to or include deleting an item listing from one or more search result pages, not displaying such item listing to one or more search result page, encrypting, masking, obfuscating, hashing and/or otherwise changing a value of the first item listing such that a user cannot view the removed item listing. As described herein, in some embodiments removal can include setting a soft delete or other marker, to the storage 125, of item listings for a specific user or account such that the marked item listings will not be displayed to future sessions (e.g., future queries or future TCP/IP connections to a server associated with a web application).

In some embodiments, the removing of at least the first item listing at block 1010 includes automatically and additionally removing a second item listing based on a selection of the UI element. For example, as described above, the additional item listing 608 can be removed in addition to the item listing 606.

Figure 11:
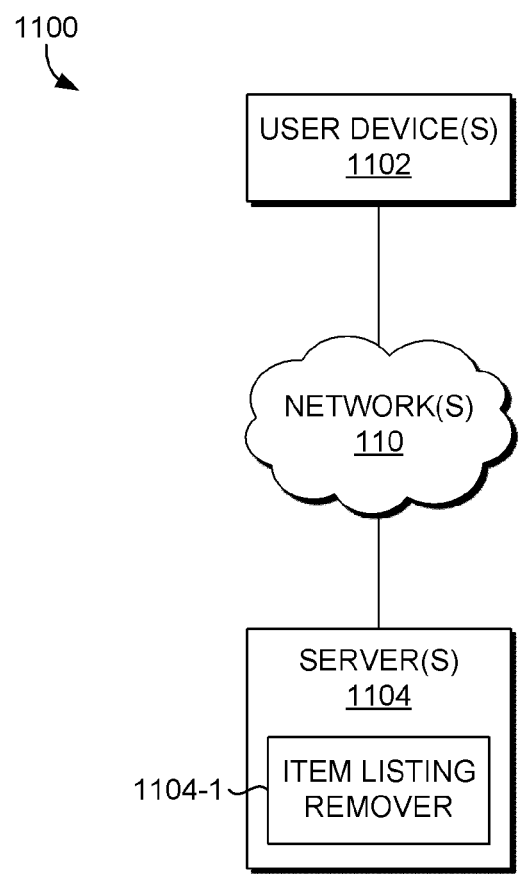
FIG. 11 is a block diagram of a computing environment in which aspects of the present disclosure are employed in, according to some embodiments.

FIG. 11 is a block diagram of a computing environment 1100 in which aspects of the present disclosure are employed in, according to certain embodiments. Although the environment 1100 illustrates specific components at a specific quantity, it is recognized that more or less components may be included in the computing environment 1100. For example, in some embodiments, there are multiple user devices 1102 and multiple servers 1104 (e.g., electronic marketplace servers), such as nodes in a cloud or distributing computing environment. In some embodiments, some or each of the components of the system 100 of FIG. 1 are hosted in the one or more servers 1104. Alternatively, in some embodiments, some or each of the components of the system 100 are hosted in the user device 1102. In some embodiments, the user device(s) 1002 and/or the server(s) 1104 may be embodied in any physical hardware, such as the computing device 1200 of FIG. 11. The one or more servers 1104 include the item listing remover 1104-1. In some embodiments, the item listing remover 12-1 represents or includes the functionality of the item listing remover 114 of FIG. 1.

The one or more user devices 1102 are communicatively coupled to the server(s) 1104 via the one or more networks 110. In practice, the connection may be any viable data transport network, such as, for example, a LAN or WAN. Network(s) 110 can be for example, a local area network (LAN), a wide area network (WAN) such as the Internet, or a combination of the two, and include wired, wireless, or fiber optic connections. In general, network(s) 110 can be any combination of connections and protocols that will support communications between the control server(s) 1104 and the user devices 1102.

In some embodiments, a user issues a query on the one or more user devices 1102, after which the user device(s) 1102 communicate, via the network(s) 110, to the one or more servers 1104 and the one or more servers 1104 executes the query (e.g., via one or more components of FIG. 1) and causes or provides for display information back to the user device(s) 1102. For example, the user may issue a query at the user device 1102 that indicates an item for sale in an electronic marketplace. Responsively, the one or more servers 1104 execute the query, such as providing the search results 602, as indicated in the screenshot 600 of FIG. 6.

The invention may be described in the general context of computer code or machine-useable instructions, including computer-executable instructions such as program modules, being executed by a computer (or one or more processors) or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Figure 12:
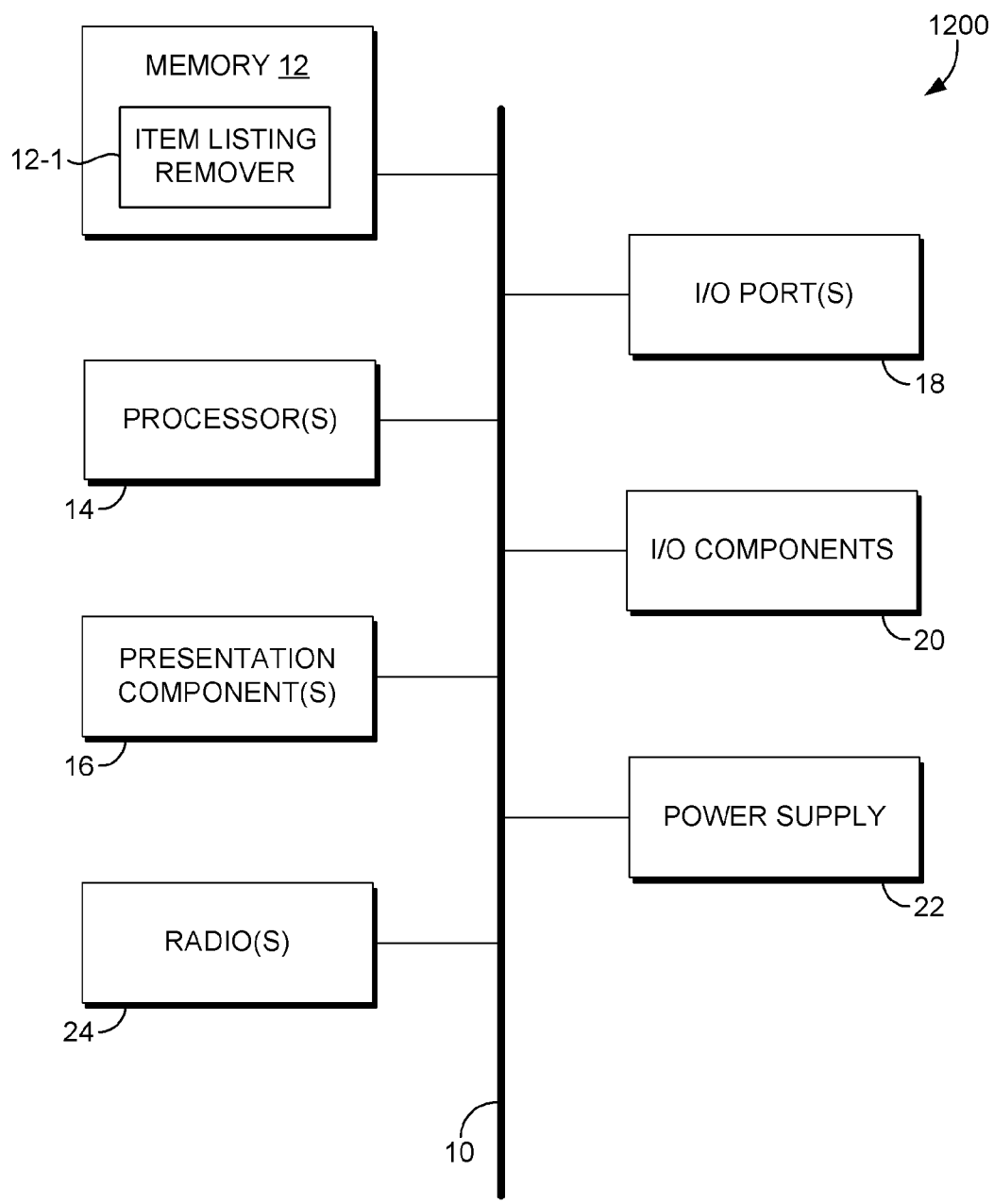
FIG. 12 is a block diagram of a computing device in which aspects of the present disclosure are implemented within, according to some embodiments.

With reference to FIG. 12, computing device 1200 includes bus 10 that directly or indirectly couples the following devices: memory 12, one or more processors 14, one or more presentation components 16, input/output (I/O) ports 18, input/output components 20, and illustrative power supply 22. Bus 10 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that this diagram is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

In some embodiments, the computing device 1200 represents the physical embodiments of one or more systems and/or components described above. For example, the computing device 1200 can represent: the one or more user devices 1102, the server(s) 1104 of FIG. 11. The computing device 1200 can also perform some or each of the blocks in the process 900, 1000 and/or any functionality described herein with respect to FIGS. 1-11. It is understood that the computing device 1200 is not to be construed necessarily as a generic computer that performs generic functions. Rather, the computing device 1200 in some embodiments is a particular machine or special-purpose computer. For example, in some embodiments, the computing device 1200 is or includes: a multi-user mainframe computer system, one or more cloud computing nodes, a single-user system, or a server computer or similar device that has little or no direct user interface, but receives requests from other computer systems (clients), a desktop computer, portable computer, laptop or notebook computer, tablet computer, pocket computer, telephone, smart phone, smart watch, or any other suitable type of electronic device.

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200.

Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors 14 that read data from various entities such as memory 12 or I/O components 20. Presentation component(s) 16 present data indications to a user or other device. Exemplary presentation components include a display device, speaker, printing component, vibrating component, etc. Memory 12 includes the item listing remover 12-1. In some embodiments, the item listing remover 12-1 represents or includes the functionality of the item listing remover 114 of FIG. 1.

I/O ports 18 allow computing device 1200 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 1200. The computing device 1200 may be equipped with depth cameras, such as, stereoscopic camera systems, infrared camera systems, RGB camera systems, and combinations of these for gesture detection and recognition. Additionally, the computing device 1200 may be equipped with accelerometers or gyroscopes that enable detection of motion.

As described above, implementations of the present disclosure relate to automatically generating a user interface or rendering one or more applications based on contextual data received about a particular user. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" or "component" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The terms first (e.g., first cache), second (e.g., second cache), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, a server computing device may "cause" a message to be displayed to a user device (e.g., via transmitting a message to the user device) and/or the same user device may "cause" the same message to be displayed (e.g., via a processor that executes instructions and data in a display memory of the user device). Accordingly, one or both systems may in isolation or together "cause" the effect of displaying a message.

What is claimed is:

1. A computer-implemented method comprising:
receiving a plurality of item listings, each item listing describing a respective item for sale in an electronic marketplace, each item listing including a plurality of attributes;
for a first item listing, of the plurality of item listings, marking a subset of attributes, of the plurality of attributes, as selectable by a user to remove a corresponding item listing, wherein at least one other attribute not included in the subset of attributes is not selectable by the user to remove the corresponding item listing;
subsequent to the marking, receiving a query for a first item that is for sale in the electronic marketplace, the query being issued at a computing device associated with a user;
in response to the receiving of the query and based at least in part on the marking of the subset of attributes as selectable, providing, to the computing device, a first set of item listings, of the plurality of item listings, associated with the first item, the first set of item listings are indicative of search results for the query, the first set of item listings including the first item listing, the first item listing including a selectable user interface element corresponding to the subset of attributes marked as selectable;
subsequent to the providing of the first set of item listings, receiving an indication that the user has selected the selectable user interface element, the selection being indicative of the user requesting direct removal, from the search results, of the first item listing and the selection being further indicative of the user requesting removal of each item listing that has the subset of attributes; and
based at least in part on the selection of the user interface element, automatically causing removal of at least the first item listing and a second item listing as search results for the query.

2. The method of claim 1, wherein the particular attribute value corresponds to a particular item category, and wherein the selection of the user interface element is partially indicative of a request to remove each item listing that belongs to the particular item category.

3. The method of claim 1, wherein the particular attribute value includes an aspect value of a particular brand of the item or a particular color of the item, and wherein the selection of the user interface element is partially indicative of a request to remove each item listing that indicates the particular brand or the particular color.

4. The method of claim 1, wherein the first item listing includes a first image and first text and the second item listing includes a second image and second text, and wherein the selection of the user interface element is partially indicative of a request to remove each item listing that includes a similar image and similar text relative to the first item listing, wherein the method further comprising:
in response to receiving the request to remove each item listing that includes the similar image and similar text relative to the first item listing, determining that the first image is similar to the second image and the first text is similar to the second text; and
based at least in part on determining that the first image is similar to the second image and the first text is similar to the second text, removing the second item listing from the search results.

5. The method of claim 4, further comprising in response to the receiving of the indication of the selection to remove each item listing that includes a similar image and similar text, generating a mask to be displayed over each image and text of each item listing that includes a similar image and similar text.

6. The method of claim 1, wherein the automatically causing removal includes automatically removing a third item listing, of the first set of item listings, based on the selection of the user interface element.

7. The method of claim 1, further comprising, causing, prior to the removing of at least the second item listing, display of an indicator to the computing device, the indicator denoting that at least the second item listing is a candidate for removal.

8. The method of claim 1, wherein the selection is further indicative of a request to remove a currently selected item listing, the currently selected item listing being the first item listing.

9. The method of claim 1, further comprising: determining which aspect value, of the first item, meets a threshold for describing the first item and marking a corresponding aspect value as selectable to remove associated item listings based on the determining.

10. A system comprising:
at least one processor; and
at least one computer readable data storage device storing instructions that, when executed by the at least one processor, cause the system to:
receive a plurality of item listings, each item listing describing a respective item for sale in an electronic marketplace, each item listing including a plurality of attributes;
for a first item listing, of the plurality of item listings, mark a subset of attributes, of the plurality of attributes, as selectable by a user to remove a corresponding item listing, wherein at least one other attribute not included in the subset of attributes is not selectable by the user to remove the corresponding item listing;
subsequent to the marking, receive a query for a first item that is for sale in the electronic marketplace, the query being issued at a computing device associated with a user;
in response to the receiving of the query and based at least in part on the marking of the subset of attributes as selectable, provide, to the computing device, a first set of item listings, of the plurality of item listings, the first set of item listings are indicative of search results for the query, the first item listing including a selectable user interface element corresponding to the subset of attributes marked as selectable;
subsequent to the providing, receive an indication that the user has selected the selectable user interface element, the selection being indicative of the user requesting direct removal, from the search results, of the first item listing and the selection being further indicative of the user requesting removal of each item listing that has the subset of attributes; and
based at least in part on the selection of the user interface element, automatically cause a removal of at least the first item listing and a second item listing as search results for the query.

11. The system of claim 10, wherein the subset of attributes correspond to a particular item category, and wherein the selection is at least partially indicative of a request to remove each item listing that belongs to the particular item category.

12. The system of claim 10, wherein the subset of attributes include an aspect value that describes a particular aspect of the first item, and wherein the selection is at least partially indicative of a request to remove each item listing that indicates the aspect value.

13. The system of claim 10, wherein the selection is at least partially indicative of a request to remove each item listing that includes a similar image or similar text relative to the first item listing.

14. The system of claim 10, wherein the system is further caused to automatically mark the second item listing, of the first set of item listings, as another candidate for removal as another search result for the query.

15. The system of claim 10, wherein the selection is further indicative of a request to remove a currently selected item listing, the currently selected item listing being a same item listing as the first item listing.

16. The system of claim 10, wherein the system is further caused to: determine which aspect value, of the first item, meets a threshold for describing the first item and marking a corresponding aspect value as selectable to remove associated item listings based on the determining.

17. The system of claim 10, wherein each of the first set of item listings include a user interface element that is selectable to causes removal of a selected item listing and all other item listings, from the search results, that share the particular attribute value.

18. One or more computer storage media having computer-executable instructions embodied thereon that, when executed, by one or more processors, cause the one or more processors to:

receive a plurality of item listings, each item listing describing a respective item for sale in an electronic marketplace, each item listing including a plurality of attributes;

for a first item listing, of the plurality of item listings, mark a subset of attributes, of the plurality of attributes, as selectable by a user to remove a corresponding item listing, wherein at least one other attribute not included in the subset of attributes is not selectable by the user to remove the corresponding item listing;

subsequent to the marking, receive a query for a first item that is for sale in the electronic marketplace, the query being issued at a computing device associated with a user;

in response to the receiving of the query and based at least in part on the marking of the subset of attributes as selectable, provide, to the computing device, a first set of item listings, of the plurality of item listings associated with the first item, the first set of item listings are indicative of search results for the query, the first set of item listings including the first item listing, the first item listing including a selectable user interface element corresponding to the subset of attributes marked as selectable;

subsequent to the providing of the first set of item listings, receive an indication that the user has selected the selectable user interface element, the selection being at least partially indicative of the user requesting removal, from the search results, of the first item listing and the selection being further indicative of the user requesting removal of each item listing that has the subset of attributes; and based at least in part on the selection of the user interface element, cause a removal of at least the first item listing and a second item listing as search results for the query.

19. The one or more computer storage media of claim 18, wherein the one or more processors are further caused to: in response to the receiving of the indication, automatically mark at least a second item listing, of the first set of item listings, as a second candidate for removal as another search result for the query.

* * * * *